(12) United States Patent
Tin

(10) Patent No.: US 7,916,341 B2
(45) Date of Patent: Mar. 29, 2011

(54) GENERATING AN INTERIM CONNECTION SPACE FOR SPECTRAL DATA

(75) Inventor: Siu-Kei Tin, Milpitas, CA (US)

(73) Assignee: Canon Kabushiki Kaisha, Tokyo (JP)

( * ) Notice: Subject to any disclaimer, the term of this patent is extended or adjusted under 35 U.S.C. 154(b) by 789 days.

(21) Appl. No.: 11/947,741

(22) Filed: Nov. 29, 2007

(65) Prior Publication Data

US 2009/0141321 A1 Jun. 4, 2009

(51) Int. Cl.
G06K 1/00 (2006.01)
G06K 15/00 (2006.01)
(52) U.S. Cl. .............................. 358/1.2; 358/1.9; 358/2.1
(58) Field of Classification Search .................. 358/500, 358/501, 1.14, 1.9, 2.1, 1.18, 530, 531, 532, 358/533, 534, 535, 536, 537, 538, 1.2, 518, 358/522, 523; 382/162
See application file for complete search history.

(56) References Cited

U.S. PATENT DOCUMENTS

| | | | |
|---|---|---|---|
| 6,529,613 B1 * | 3/2003 | Astle | 382/103 |
| 6,587,793 B2 | 7/2003 | Viassolo et al. | |
| 6,698,860 B2 | 3/2004 | Berns et al. | |
| 6,850,342 B2 | 2/2005 | Woolfe et al. | |
| 6,920,244 B2 | 7/2005 | Rosen et al. | |
| 7,072,511 B2 | 7/2006 | Tan et al. | |
| 7,081,925 B2 | 7/2006 | Yang et al. | |
| 7,184,057 B2 | 2/2007 | Stokes et al. | 345/600 |
| 2002/0165684 A1 | 11/2002 | Olson | |
| 2002/0196972 A1 | 12/2002 | Bayramoglu et al. | 382/167 |
| 2005/0069200 A1 | 3/2005 | Speigel et al. | 382/162 |
| 2006/0164430 A1 | 7/2006 | Tin et al. | 345/602 |

OTHER PUBLICATIONS

Zhao, et al., "Image-Based Spectral Reflectance Reconstruction Using the Matrix R Method," COLOR Research and Application, vol. 32, No. 5, Oct. 2007, pp. 343-351.
International Search Report and Written Opinion dated Jan. 26, 2009 in counterpart PCT/US2008/012870.
Wyszecki, et al., "Color Science: Concepts and Method, Quantitative Data and Formulae", 2nd Ed., Wiley, (1982).
ISO/TR 16066:2003(E), "Graphic Technology—Standard Object Color Spectra Database for Color Reproduction Evaluation" (SOCS), ISO (2003).
Johnson, et al., "Full-Spectral Color Calculations in Realistic Image Synthesis", IEEE Computer Graphics and Applications (1999).
Li, et al., "Color Constancy Based on Reflectance Functions", Proc. 14th CIC, pp. 175-179 (2006).

(Continued)

*Primary Examiner* — Jerome Grant, II
(74) *Attorney, Agent, or Firm* — Fitzpatrick, Cella, Harper & Scinto

(57) ABSTRACT

Generation of an Interim Connection Space for spectral data in a full spectral space is provided. A set of linear maps is accessed, each linear map characterizing a linear transformation from the full spectral space to a colorimetric space, and spectral measurement data is accessed. The linear maps can for example be determined by a set of illuminants. The full spectral space is decomposed into a first subspace that minimizes a loss of a spectral component in the spectral measurement data under a projection along a second subspace onto the first subspace. The second subspace is a null subspace of the set of linear maps. The Interim Connection Space is generated based on the first subspace. The Interim Connection Space can include, for example, a linear map characterizing a linear transformation from the Interim Connection Space to the full spectral space, and a linear map characterizing a linear transformation from the full spectral space to the Interim Connection Space.

23 Claims, 10 Drawing Sheets

OTHER PUBLICATIONS

U.S. Appl. No. 11/954,184, filed Dec. 11, 2007, entitled "Spectral Gamut Mapping Based on a Colorimetric Gamut Mapping" by Siu-Kei Tin.

U.S. Appl. No. 11/947,487, filed Nov. 30, 2007, entitled "Generating a Transformed Interim Connection Space for Spectral Data" by Siu-Kei Tin.

U.S. Appl. No. 11/948,977, filed Nov. 30, 2007, entitled "Generating a Device Independent Interim Connection Space for Spectral Data" by Siu-Kei Tin.

U.S. Appl. No. 12/011,318, filed Jan. 23, 2008, entitled "Gamut Mapping in Spectral Space Based on an Objective Function" by Siu-Kei Tin.

Romney, A. Kimball and Indow, T., "Munsell Reflectance Spectra Represented in Three-Dimensional Euclidean Space", School of Social Sciences, University of California-Irvine, Irvine, CA 92697-5100, Wiley Periodicals, Inc., pp. 182-196 (2003).

Greenberg, Donald P., "A Framework For Realistic Image Synthesis", Communications Of The ACM, vol. 42, No. 8, pp. 46-52, Aug. 1999.

Rosen, et al., "Answering Hunt's Web Shopping Challenge: Spectral Color Management for a Virtual Swatch", Proc. of the IS&T/SID 9th Color Imaging Conference, pp. 267-272.

Tsutsumi, Shohei, Rosen, Mitchell R., and Berns, Roy S., "Spectral Color Management using Interim Connection Spaces based on Spectral Decomposition", Proc. 14th CIC, pp. 246-251 (2006).

Rosen, Mitchell R. and Derhak, Maxim W., "Spectral Gamuts and Spectral Gamut Mapping" Proc. of SPIE-IS&T vol. 6062, pp. 1-11 (2006).

Rosen, Mitchell R. and Ohta, Noboru, "Spectral Color Processing using an Interim Connection Space", Proc. 11th CIC, pp. 187-192 (2003).

Derhak, Maxim W. and Rosen, Mitchell R., "Spectral Colorimetry Using LabPQR-An Interim Connection Space", Proc. 12th CIC, pp. 246-250 (2004).

Tsutsumi, Shohei, Rosen, Mitchell R. and Berns, Roy S., "Spectral Reproduction using LabPQR: Inverting the Fractional-Area-Coverage-to-Spectra Relationship", Proc. ICIS '06, pp. 107-110 (2006).

U.S. Appl. No. 11/609,280, filed Dec. 11, 2006, Inventor: Siu-Kei Tin.

* cited by examiner

GENERATING AN INTERIM CONNECTION SPACE FOR SPECTRAL DATA

BACKGROUND OF THE INVENTION

1. Field of the Invention

This invention pertains to Interim Connection Spaces for spectral data, and in particular, to the generation of Interim Connection Spaces for spectral data based on minimizing a loss of a spectral component in spectral measurement data.

2. Related Background Art

There is an increasing trend for color imaging applications to process and utilize spectral data, and/or to perform color processing in a spectral color space. For example, it has become common to characterize color devices such as scanners, cameras, printers and displays, in terms of their spectral responsivity, such as by obtaining a so-called spectral device profile. Once a spectral characterization of a device is obtained, operations such as transforming color data from a source device to a destination device, gamut mapping, etc., can be performed in the full spectral space.

As another example, some modern image capture devices can capture color image data in spectral or extended color spaces. In this regard, the use of spectral data such as spectral reflectance of objects and spectral power distribution of illuminants promises to yield even more advantages in the near future. Ultimately, one goal of spectral color reproduction is to produce color reproductions with remarkably high color fidelity, perhaps even matching the original scene on the spectral level. In the case of reflective objects, for example, a reproduction with a spectral match would have the same color as the original object under any illuminant.

Spectral characterization of color devices, and development of multi-spectral devices such as multi-spectral cameras and multi-spectral printers, could form the basis of a spectral color management workflow that can have very useful applications in everyday consumer products. For example, such technologies could allow online shoppers to print their own "virtual swatches" of fabrics, as detailed in the paper "Answering Hunt's Web Shopping Challenge: Spectral Color Management for a Virtual Swatch" by Rosen et al., Proceedings of the IS&T/SID $9^{th}$ Color Imaging Conference, pp. 267-272. Another application of spectral color management in computer aided design/computer aided manufacturing (CAD/CAM) applications allows manufacturers to visualize and demonstrate preliminary design ideas by simulation, before actually building a costly prototype.

While the use of spectral data can provide many advantages, such as reducing metameric color shifts, using spectral data presents some challenges. In particular, the dimensionality of spectral data typically is high compared to other types of data, such as colorimetric data. For example, conventional colorimetry-based spaces such as CIEXYZ, CIELAB, and CIECAM02, etc., have three dimensions, while full spectral space typically has thirty-one dimensions or more. This high dimensionality can significantly increase the amount of data that must be manipulated and/or stored by applications utilizing full spectral data. Consequently, these applications can suffer from increased memory requirements and decreased computational performance.

A known approach to this problem is the construction of Interim Connection Spaces (ICSs), which are of lower dimensionality than the full spectral space, for example, with five or more dimensions as opposed to the thirty-one or more dimensions of a full spectral space. In particular, typical Interim Connection Spaces provide a way to project full spectral data to lower-dimensional data with a small loss of accuracy. Processing can then occur on the lower-dimensional data, and if needed, results of the processing can be transformed into full spectrum data.

SUMMARY OF THE INVENTION

To address the foregoing, the present invention provides for generation of novel Interim Connection Spaces.

In one example embodiment of the present invention, a set of linear maps is accessed, each linear map characterizing a linear transformation from a full spectral space to a colorimetric space, and spectral measurement data is accessed. The linear maps can, for example, be determined by a set of illuminants. The full spectral space is decomposed into a first subspace that minimizes a loss of a spectral component in the spectral measurement data under a projection along a second subspace onto the first subspace. The second subspace is a null subspace of the set of linear maps. The Interim Connection Space is generated based on the first subspace. The Interim Connection Space can include, for example, a linear map characterizing a linear transformation from the Interim Connection Space to the full spectral space, and a linear map characterizing a linear transformation from the full spectral space to the Interim Connection Space.

In one example aspect of the invention, the first subspace is characterized by a linear function from a direct sum of the calorimetric spaces to the full spectral space that is a least squares fit of the spectral measurement data.

In another aspect of the present invention, the linear function corresponds to a matrix pseudo-inverse obtained by singular value decomposition. In this case, decomposing the full spectral space includes defining the first subspace to be the span of singular vectors that correspond to only non-zero singular values.

In another example aspect, an upper bound for the dimension value can be accessed, and in this case, decomposing the full spectral space can include further restricting the dimension of the first subspace to the upper bound for the dimension value.

In another example aspect of the present invention, decomposing the full spectral space includes transforming the spectral measurement data into colorimetric data using the set of linear maps, decomposing the calorimetric data to obtain a basis of the colorimetric data, and transforming the basis of colorimetric data to obtain a basis of the Interim Connection Space.

In another example embodiment of the present invention, a set of illuminants is accessed. Spectral measurement data is accessed as a first matrix, and the spectral measurement data is transformed under the set of illuminants to obtain a second matrix, which includes transformed spectral measurement data. The second matrix is decomposed to obtain a third matrix, which is a pseudo-inverse. The column vectors of the third matrix are orthogonalized to obtain a fourth matrix, which characterizes an orthonormal basis. The Interim Connection Space is generated based on the fourth matrix.

In an example aspect of the invention, an upper bound for the dimension value is accessed, and decomposing the second matrix includes restricting the dimension of the range space of third matrix to the upper bound for the dimension value.

In another aspect of the invention, the Interim Connection Space can include a linear map characterizing a linear transformation from the Interim Connection Space to the full spectral space, and a linear map characterizing a linear transformation from the full spectral space to the Interim Connection Space.

In yet another example aspect of the present invention, the set of illuminants comprises spectral power distributions of each illuminant.

The invention may be embodied in a method, apparatus or computer-executable program code.

The generated ICSs can provide several benefits. For example, generation of the ICSs using a set of illuminants can provide ICSs optimized for a plurality of illuminants. This benefit can result in increased accuracy over a plurality of illuminants, while maintaining sufficient accuracy on other illuminants. In addition, optimization can be provided for arbitrary illuminants, thus allowing greater flexibility in generating ICSs. Moreover, because a significant portion of the processing of spectral data can take place in an ICS, a more accurate ICS can meet the more stringent quality requirements for spectral imaging.

This brief summary has been provided so that the nature of the invention may be understood quickly. A more complete understanding of the invention can be obtained by reference to the following detailed description in connection with the attached drawings.

DETAILED DESCRIPTION

Figure 1:
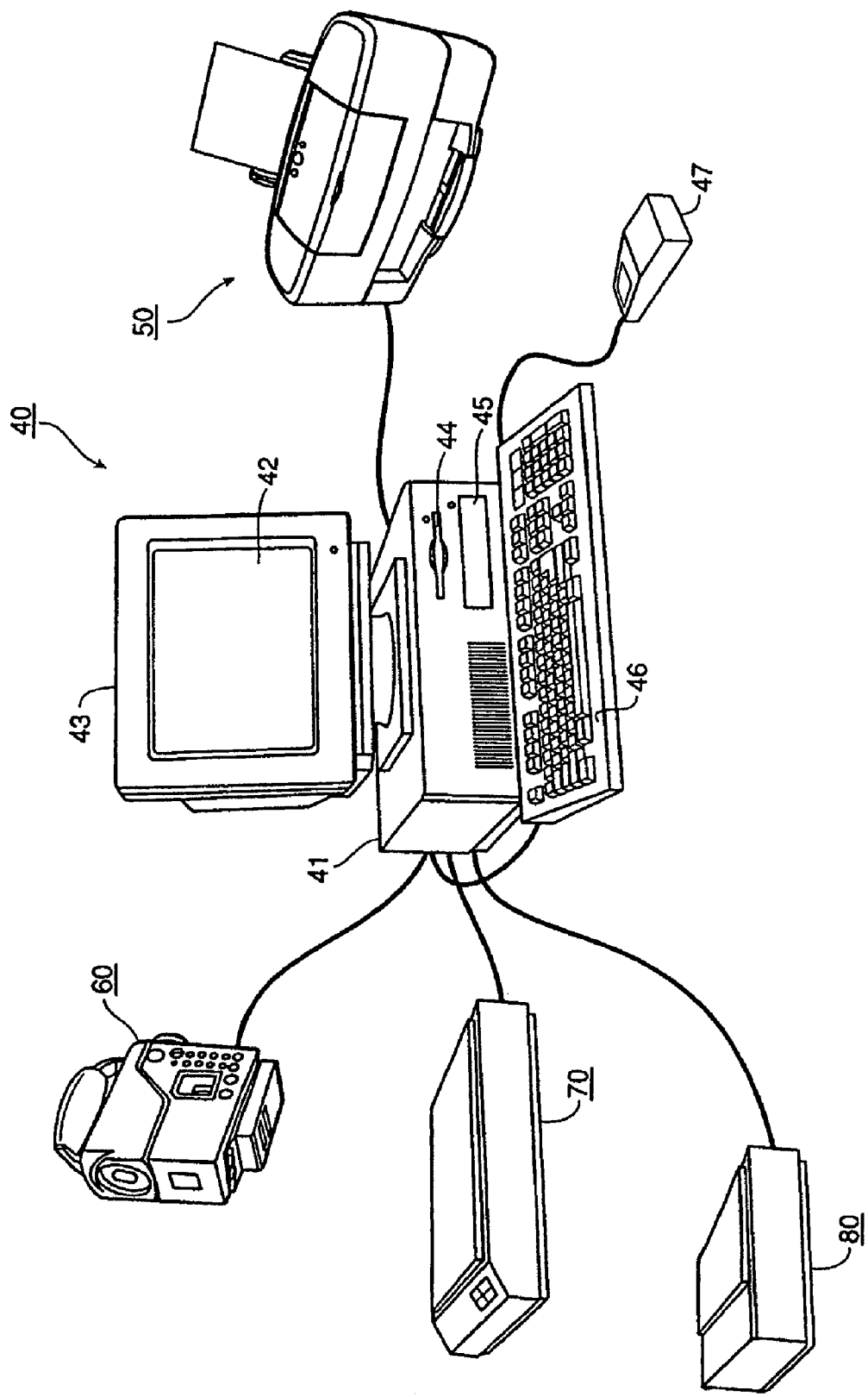
FIG. 1 is a perspective view of an exemplary computing environment in which the present invention may be implemented.

FIG. 1 is a perspective view of a representative computing system including a data processing system 40, peripherals and digital devices that may be used in connection with the practice of the present invention. Data processing system 40 includes host processor 41, which comprises a personal computer (hereinafter "PC"). Provided with data processing system 40 are color monitor 43 including display screen 42, keyboard 46 for entering text data and user commands, and pointing device 47. Pointing device 47 can comprise a mouse and/or a pen-style input device (not shown) for pointing and for manipulating objects displayed on display screen 42.

Data processing system 40 includes a computer-readable memory medium such as computer fixed disk 45 and/or floppy disk drive 44. Floppy disk drive 44 provides a means whereby data processing system 40 can access information, such as image data, computer-executable process steps, application programs, etc. stored on removable memory media. A similar CD-ROM interface (not shown) may be provided for data processing system 40 through which data processing system 40 can access information stored on removable CD-ROM media.

Printer 50 is a printer, such as a color bubble jet printer, which forms color images on a recording medium such as paper or transparencies or the like. In addition, digital color scanner 70 is provided for scanning documents and images into data processing system 40 and digital color camera 60 is provided for sending digital images to data processing system 40. Of course, data processing system 40 may acquire digital image data from other sources such as a digital video camera, a server on a local area network, the Internet, etc. (not shown). A spectrophotometer 80 may be provided for measuring the spectral reflectance of a color sample, and sending the spectral data to data processing system 40.

Figure 2:
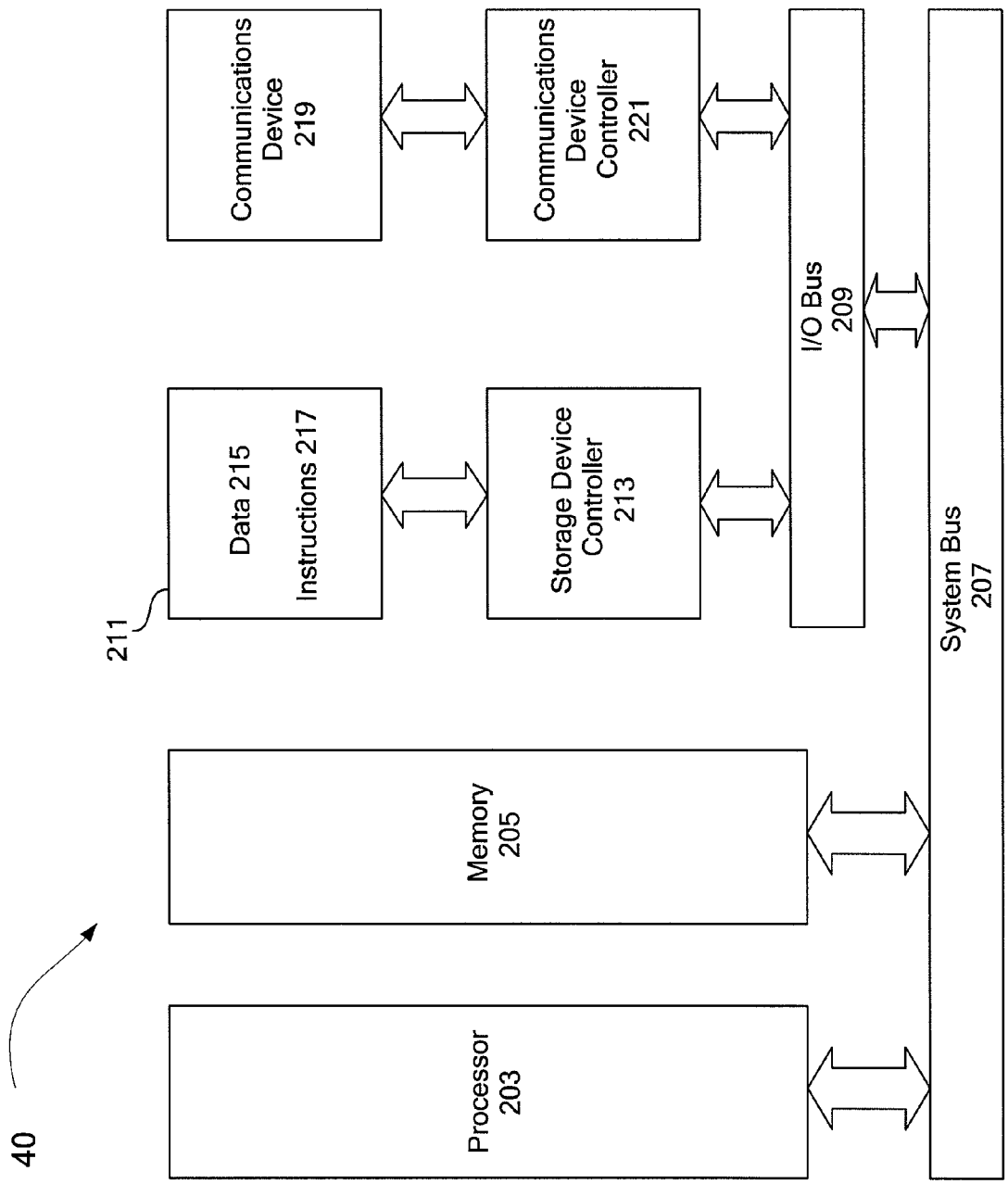
FIG. 2 is a block diagram of an exemplary computer architecture in which the present invention may be implemented.

FIG. 2 is an architecture diagram of an exemplary data processing system 40. Data processing system 40 includes a processor 203 coupled to a memory 205 via system bus 207. The processor is also coupled to external Input/Output (PO) devices (not shown) via the system bus 207 and an I/O bus 209. A storage device 211 having a computer-readable medium is coupled to the processor 203 via a storage device controller 213 and the I/O bus 209 and the system bus 207. The storage device 211 is used by the processor 203 and controller 213 to store and read/write data 215 and program instructions 217 used to implement the procedures described below.

The processor 203 may be further coupled to a communications device 219 via a communications device controller 221 coupled to the I/O bus 209. The processor 203 uses the communications device 219 to communicate with a network (not shown).

In operation, the processor 203 loads the program instructions 217 from the storage device 211 into the memory 205. The processor 203 then executes the loaded program instructions 217 to perform any of the methods described below. Thus, processor 203 operates under the control of the instructions 217 to perform the methods of the present invention, as described in more detail below.

Figure 3:
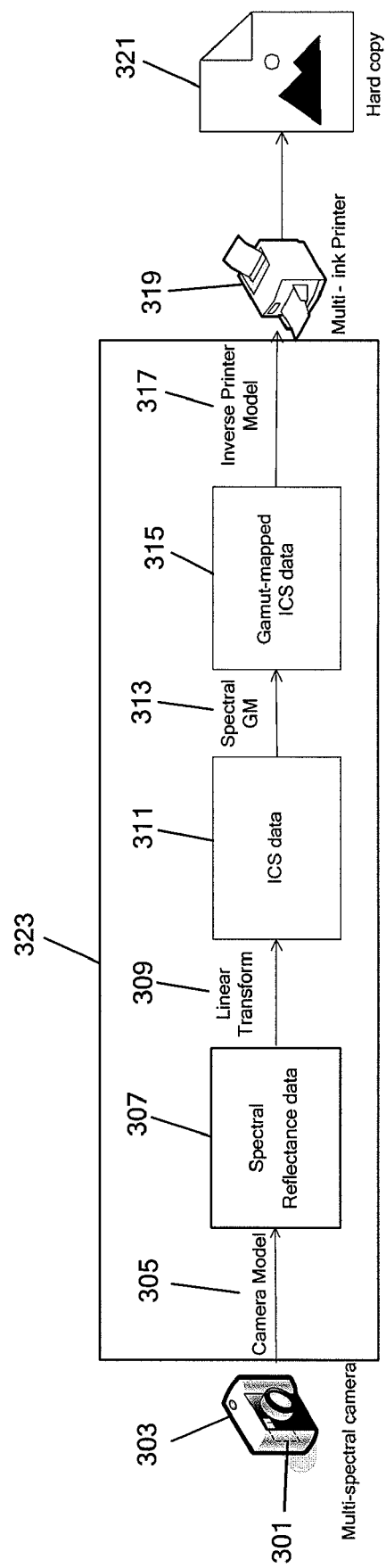
FIG. 3 is a representational diagram of an example workflow in which embodiments of the invention can be implemented.

FIG. 3 shows one example embodiment of the present invention. In particular, FIG. 3 shows an example printer workflow utilizing an ICS generated by methods of the present invention.

In the present example workflow of FIG. 3, source image data 301 from a source multi-spectral device, such as a multi-spectral camera 303, is converted into spectral reflectance data 307 using a device transform, such as a camera model 305. Spectral reflectance data 307 is transformed into ICS data 311 using a linear transform 309, such as a transform generated by one of the example methods described below. A spectral gamut-mapping 313 is performed on ICS data 311 to obtain gamut-mapped ICS data 315. An inverse printer model 317 is applied to gamut-mapped ICS data 315, and the resulting data is sent to a multi-ink output printer 319, for example, which produces a hard copy 321 of image data 301.

Elements 305 to 317 of FIG. 3 define a color management module (CMM) 323, which can be implemented, for example, as part of program instructions 217 executed by data processing system 40 of FIG. 2.

The workflow of FIG. 3 performs gamut-mapping within an ICS. In order to transform image data into the ICS, this example workflow first converts image data from a camera or other device into spectral reflectance data, and then utilizes a linear transform 309 to transform the spectral data into ICS data. In this regard, linear transform 309 specifies the transformation from a full spectral space to the ICS.

The printer workflow illustrated in FIG. 3 is one example of an application of ICS in various stages of an image reproduction pipeline, for example, gamut mapping, transformations, image processing, etc. These various stages generally include processes and calculations that themselves introduce errors that end up in the final result of the reproduction. However, the ICS itself, not just the eventual operation using the ICS, can already have errors resulting from how the ICS is constructed. The errors can result, for example, from a truncation operation from the full spectral space to the ICS that occurs during the ICS construction. This truncation error can be measured by a round-trip error. In other words, if the original spectrum is s, converting this to an ICS value and then converting from the ICS value back to the full spectral space results in a new spectrum ŝ. The difference between the original spectrum and the new spectrum is an example of round-trip error.

Because ICS is the space where many constructions, such as building the spectral gamut, and operations, such as checking in-gamut or not, will take place, reducing the truncation errors of an ICS has the potential to benefit many applications. On the other hand, the requirement of computational efficiency can dictate lower dimensional ICS, which in turn can imply higher truncation errors. An interplay between dimension and truncation errors can play an important role in designing and constructing ICS.

One approach identified herein relates to illuminants. In particular, construction of an ICS based on a limited set of illuminants may reduce truncation errors, while maintaining low dimension of the ICS, in many applications. This approach might be particularly useful given that in many applications, certain illuminants are emphasized, say for the purpose of quality evaluation. For example, graphics art industry uses the $D_{50}$ illuminant, while $D_{65}$ is de facto standard in many other color applications. In this regard, if one knows beforehand that a particular application utilizing an ICS has a preferred set of illuminants, then it might be fruitful to make use of this knowledge in the construction of the ICS.

Figure 4:
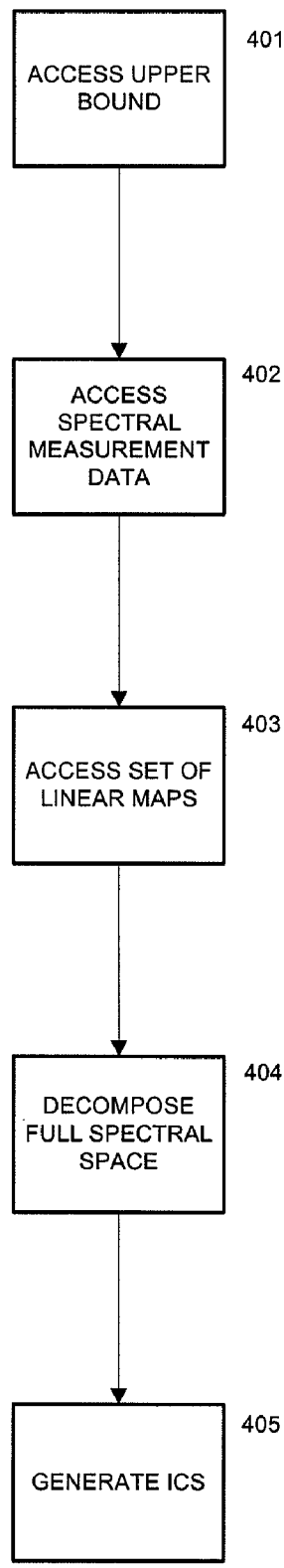
FIG. 4 is a process flowchart of one example method of generating an ICS according to one example embodiment of the present invention.

One method of constructing an ICS according to one embodiment of the present invention will now be described with reference to FIG. 4.

Initially, an upper bound ICS dimension $n_0$ is accessed (401). The upper bound is a maximum value of dimension for the final result of the process of constructing the ICS. The upper bound will typically be a system/problem specific parameter. For example, in building an ICS for a 6-ink printer, the upper bound can be taken to be 6. It can also be the result of tuning the system, say by trial-and-error or experimentation. For example, to continue the 6-ink printer example, it may be determined by trial and error that a dimension of 5 is sufficient to satisfy the quality requirement of a particular application and an upper bound of 5 is preferred to 6 for reason of computational performance.

Spectral measurement data, such as spectral reflectance data of color samples, is accessed (402). Additionally, in this embodiment the spectral measurements use the same sampling with a common starting wavelength $\lambda_0$, number of wavelength bands N and wavelength step size $\Delta\lambda$. This can always be achieved by re-sampling and normalization if necessary.

Figure 5:
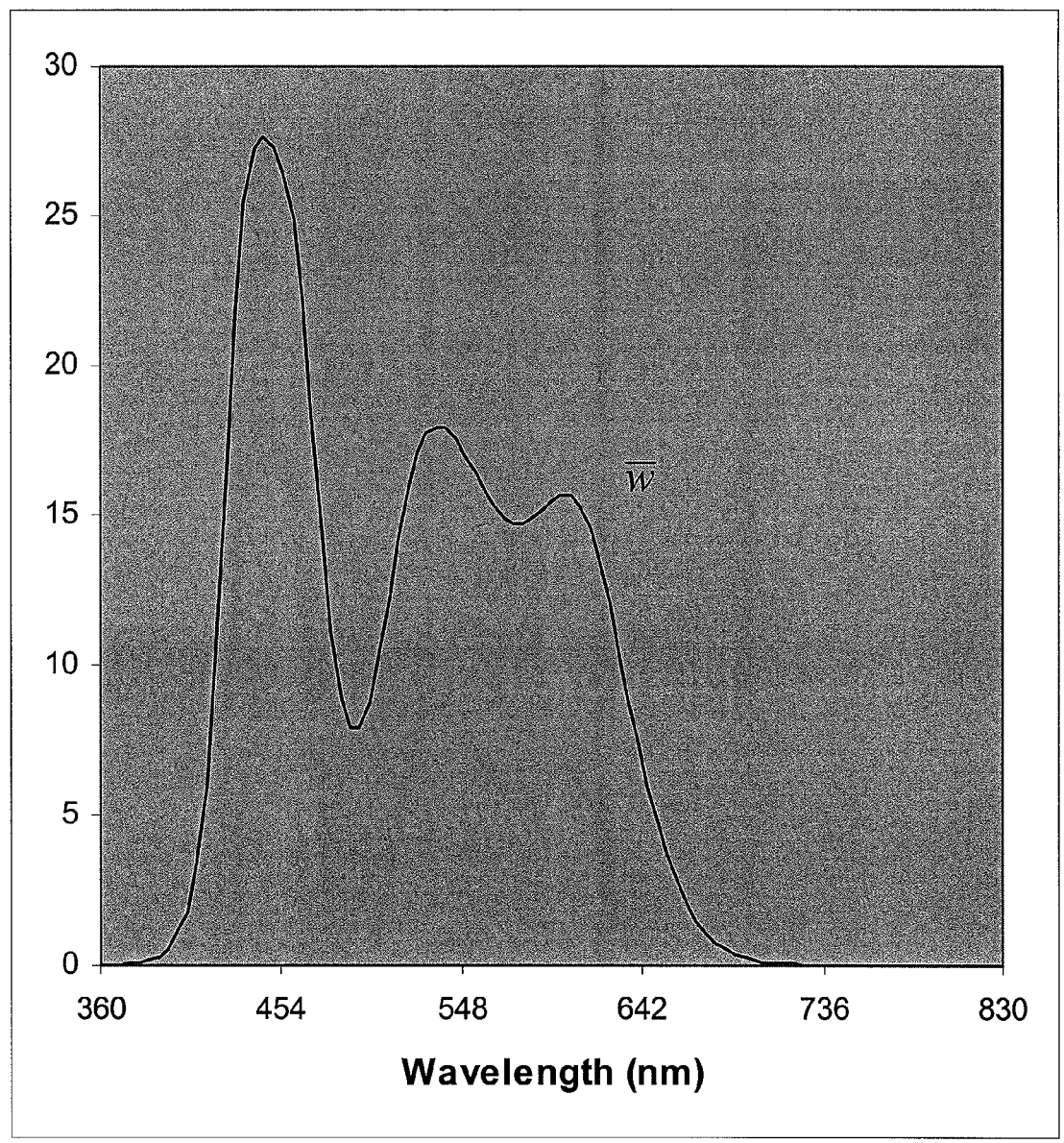
FIG. 5 is a graph of one example Spectral Weighting Function that is based on a wavelength dependence of human vision that can be used in one example embodiment of the present invention.

A full spectral space, denoted $S \subseteq R^N$, can be, for example, the space of raw, unweighted, spectral reflectances. Another option is to weight the spectral reflectances, for example, by applying a Spectral Weighting Function $\overline{w}(\lambda)$ that is based on a wavelength dependence of a predetermined sensor. FIG. 5 shows one example Spectral Weighting Function that is based on a wavelength dependence of human vision. In general terms, a Spectral Weighting Function is constructed so that more weight is put on a wavelength if the sensor, e.g. the human visual system, is more sensitive to that wavelength. In particular, the maxima of the curve in FIG. 5 coincide with the maxima of the CIE Color Matching Functions. Construction of Spectral Weighting Functions is described in more detail in copending U.S. patent application Ser. No. 11/609,280, "CONSTRUCTING BASIS FUNCTIONS USING SENSOR WAVELENGTH DEPENDENCE", filed on Dec. 11, 2006, the contents of which are incorporated by reference herein.

By weighting the spectral reflectances, a "Weighted Spectral Space" is defined. A weighted spectral reflectance is obtained by applying a diagonal scaling matrix $\overline{W}$ to the raw spectral reflectance:

$$x \mapsto \overline{W}x$$

$$\text{where } \overline{W} = \begin{pmatrix} \overline{w}_0 & & & \\ & \overline{w}_1 & & 0 \\ & 0 & \ddots & \\ & & & \overline{w}_{N-1} \end{pmatrix}$$

and $\overline{w}_0, \ldots, \overline{w}_{N-1}$ are the values of $\overline{w}(\lambda)$ at the sampling wavelengths.

In the case that the raw spectral measurement data consists of measurements of M color samples on N wavelengths, an N×M matrix C is formed by organizing the spectral measurements (weighted or unweighted, depending on whether the weighted spectral space or the unweighted spectral space is used) column by column.

A set of m linear maps is accessed (403). Each linear map characterizes a linear transformation from the full spectral space S to a calorimetric space.

In the present example embodiment, the calorimetric space is XYZ space. The set of linear maps, therefore, corresponds to the set of m illuminants on which the construction of the ICS is based. Using a set of linear maps in the generation of the ICS can provide an ICS that is better optimized across the set of corresponding illuminants.

In particular, a 3m×N matrix A is formed from the Spectral Power Distributions (SPD's) $\mathfrak{I}_1(\lambda), \ldots, \mathfrak{I}_m(\lambda)$ of the illuminants in the set. The matrix A corresponds to a linear map from the full spectral space S to a 3m-dimensional space that is the direct sum of m copies of the XYZ spaces. In the case that S is the unweighted spectral space, A is given by:

$$A = \begin{pmatrix} X_1(\lambda_0) & X_1(\lambda_0 + \Delta\lambda) & \cdots & X_1(\lambda_0 + (N-1)\Delta\lambda) \\ Y_1(\lambda_0) & Y_1(\lambda_0 + \Delta\lambda) & \cdots & Y_1(\lambda_0 + (N-1)\Delta\lambda) \\ Z_1(\lambda_0) & Z_1(\lambda_0 + \Delta\lambda) & \cdots & Z_1(\lambda_0 + (N-1)\Delta\lambda) \\ \vdots & \vdots & \vdots & \\ X_m(\lambda_0) & X_m(\lambda_0 + \Delta\lambda) & \cdots & X_m(\lambda_0 + (N-1)\Delta\lambda) \\ Y_m(\lambda_0) & Y_m(\lambda_0 + \Delta\lambda) & \cdots & Y_m(\lambda_0 + (N-1)\Delta\lambda) \\ Z_m(\lambda_0) & Z_m(\lambda_0 + \Delta\lambda) & \cdots & Z_m(\lambda_0 + (N-1)\Delta\lambda) \end{pmatrix}$$

where:

$$X_i(\lambda) = \rho_i \int_\eta \bar{x}(\eta) \mathfrak{I}_i(\eta) \delta(\eta - \lambda) d\eta \Big/ \int_\eta \bar{y}(\eta) \mathfrak{I}_i(\eta) d\eta$$

$$Y_i(\lambda) = \rho_i \int_\eta \bar{y}(\eta) \mathfrak{I}_i(\eta) \delta(\eta - \lambda) d\eta \Big/ \int_\eta \bar{y}(\eta) \mathfrak{I}_i(\eta) d\eta$$

$$Z_i(\lambda) = \rho_i \int_\eta \bar{z}(\eta) \mathfrak{I}_i(\eta) \delta(\eta - \lambda) d\eta \Big/ \int_\eta \bar{y}(\eta) \mathfrak{I}_i(\eta) d\eta$$

$\bar{x}(\eta), \bar{y}(\eta), \bar{z}(\eta)$ are the CIE Color Matching Functions, $\delta(\eta) = \max\left(0, 1 - \frac{|\eta|}{\Delta\lambda}\right)$ is the discrete impulse function, and $\rho_1, \ldots, \rho_m \geq 0$, $\rho_1 + \ldots + \rho_m = 1$ are optional weights that can be applied to rank the relative importance of the illuminants. If there is no preference on the illuminants, the optional weights can be set equal to each other. In the case that S is the weighted spectral space, the above equations should be replaced by:

$$X_i(\lambda) = \rho_i \int_\eta \bar{x}(\eta) \mathfrak{I}_i(\eta) \bar{w}(\eta)^{-1} \delta(\eta - \lambda) d\eta \Big/ \int_\eta \bar{y}(\eta) \mathfrak{I}_i(\eta) d\eta$$

$$Y_i(\lambda) = \rho_i \int_\eta \bar{y}(\eta) \mathfrak{I}_i(\eta) \bar{w}(\eta)^{-1} \delta(\eta - \lambda) d\eta \Big/ \int_\eta \bar{y}(\eta) \mathfrak{I}_i(\eta) d\eta$$

$$Z_i(\lambda) = \rho_i \int_\eta \bar{z}(\eta) \mathfrak{I}_i(\eta) \bar{w}(\eta)^{-1} \delta(\eta - \lambda) d\eta \Big/ \int_\eta \bar{y}(\eta) \mathfrak{I}_i(\eta) d\eta$$

As mentioned above, basing the construction of the ICS on a set of linear maps corresponding to a set of predetermined illuminants can result in an ICS that is better optimized for the predetermined illuminants. In the next step, the full spectral space is decomposed (404) into a first subspace that minimizes a loss of a spectral component in the spectral measurement data under a projection along a second subspace onto the first subspace. This decomposition can provide the further benefit of reducing errors under other illuminants, i.e., illuminants outside of the set of predetermined illuminants. The reason for the reduction of errors under other illuminants will now be described with reference to FIGS. 6 and 7.

First, it is noted that the "null space" of the matrix A corresponds to the "metameric black subspace" under the predetermined illuminants. In other words, a spectrum in the metameric black subspace can be added to a spectrum without changing the XYZ values of the spectrum under the predetermined illuminants. Therefore, if a suitable metameric black component is removed from each spectrum, a reduction of the dimensionality of the spectrum can be achieved with little or no affect on accuracy under the predetermined illuminants.

Figure 6:
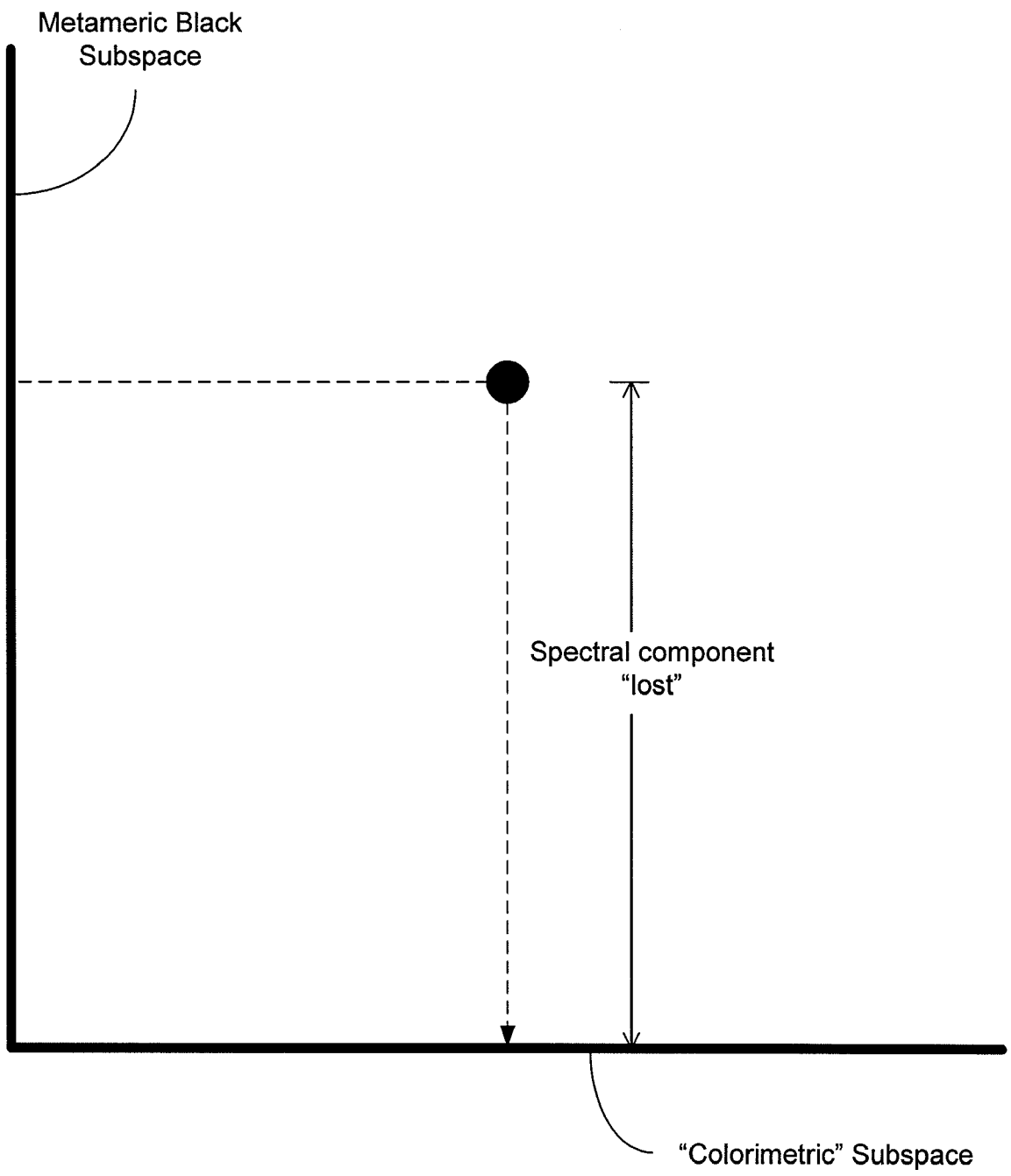
FIG. 6 is a graph that illustrates removal of a component that lies in metameric black space based on orthogonal decomposition.

One way to accomplish this is by splitting a spectrum into a "metameric black component" and a "colorimetric component." FIG. 6 illustrates these two components as a metameric black subspace and a colorimetric subspace. In this regard, it is noted that this splitting is not unique. In particular, each splitting corresponds to a "pseudo-inverse" of A. Namely, if B is a N×3m matrix that satisfies $AB = I_{3m}$, the 3m-dimensional identity matrix, then any spectrum s can be split into:

$$s = BAs + (s - BAs)$$

with $s - BAs$ in the metameric black subspace, because $A(s - BAs) = 0$. A well-known pseudo-inverse is the Moore-Penrose inverse $A^+$:

$$A^+ = A^T (AA^T)^{-1}$$

if $(AA^T)^{-1}$ exists. A full spectral space splitting corresponding to the Moore-Penrose pseudo-inverse is the decomposition of S into the metameric black subspace and its orthogonal complement, as shown in FIG. 6. FIG. 6 also illustrates that removal of a component that lies in the metameric black space ("spectral component lost") can potentially result in loss of a large component relative to a distance metric in S. While this procedure will not affect the XYZ's under the illuminants $\mathfrak{I}_1(\lambda), \ldots, \mathfrak{I}_m(\lambda)$, it may have a detrimental effect on other illuminants, for example, even illuminants that are closely related, or a perturbation of an illuminant in $\mathfrak{I}_1(\lambda), \ldots, \mathfrak{I}_m(\lambda)$. In addition, such a procedure may not be robust relative to errors in the SPD's of the illuminants in the set, since for example, two slightly different SPD's may result from different measurements of the same illuminant.

Figure 7:
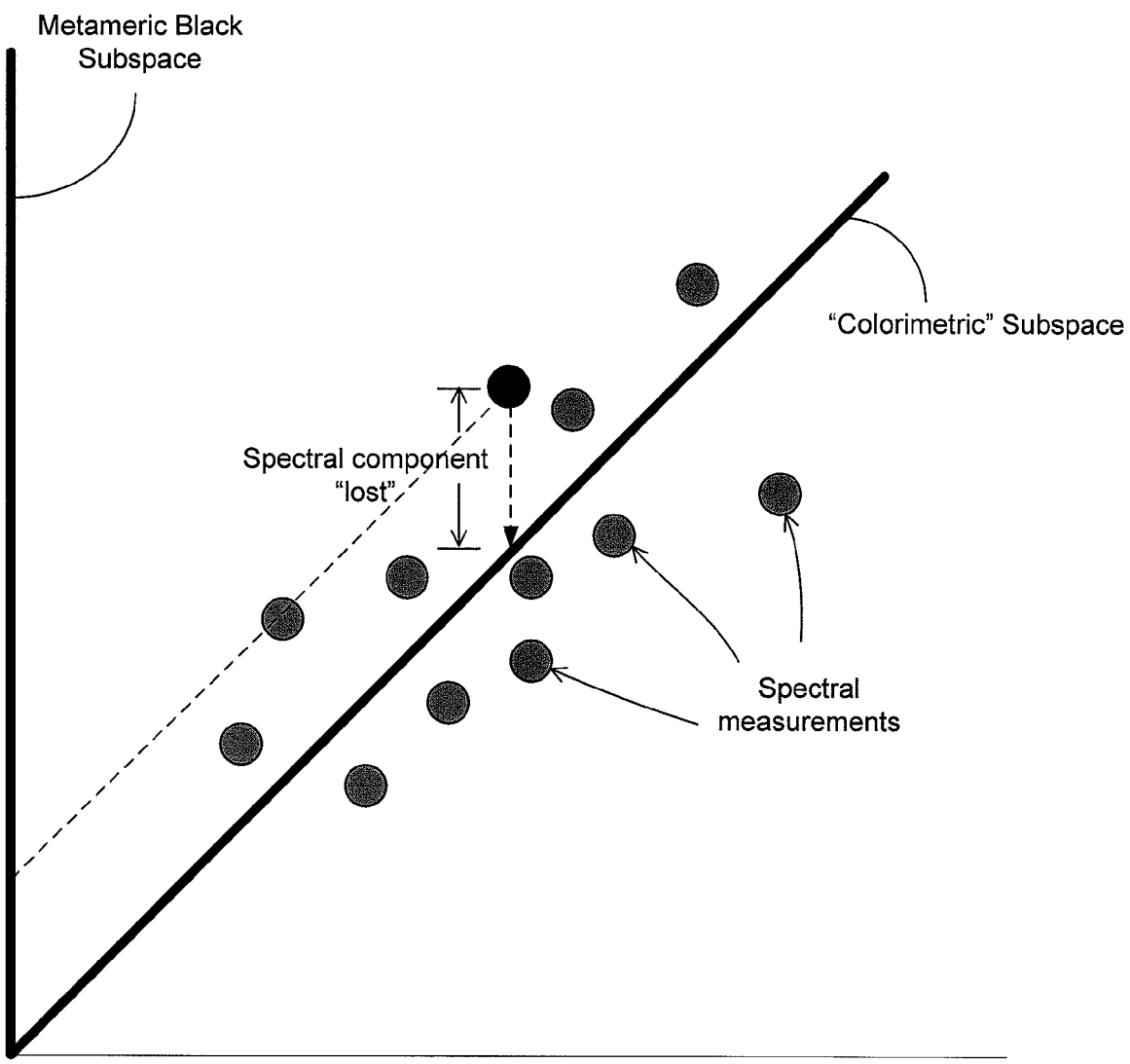
FIG. 7 is a graph that illustrates an example of removal of a component that lies in the metameric black space based on decomposition using the result of a least squares fit to spectral measurement data.

However, FIG. 7 illustrates a different scenario in which the loss of a spectral component has been reduced. In this regard, a different pseudo-inverse that would reduce or minimize the loss of spectral component under projection can be determined. For example, for any N×M matrix K, it can be shown that if $(AKK^TA^T)^{-1}$ exists, then $B = KK^TA^T(AKK^TA^T)^{-1}$ also satisfies $AB = I_{3m}$. (It is noted that the requirement that $(AKK^TA^T)^{-1}$ exists can be removed by, for example, restricting to a subspace where the singular values are non-zero). The case $K = I_N$ corresponds to the Moore-Penrose inverse. However, if $K = C$, the matrix that is formed by the M spectral measurements as defined above, then B represents a linear function from the 3m-dimensional direct sum of XYZ spaces to the spectral space that is a least squares fit of the measurements at each wavelength.

In light of the foregoing observations, the decomposing 404 of the full spectral space can be accomplished such that a loss of a special component in the spectral measurement data is minimized.

Figure 8:
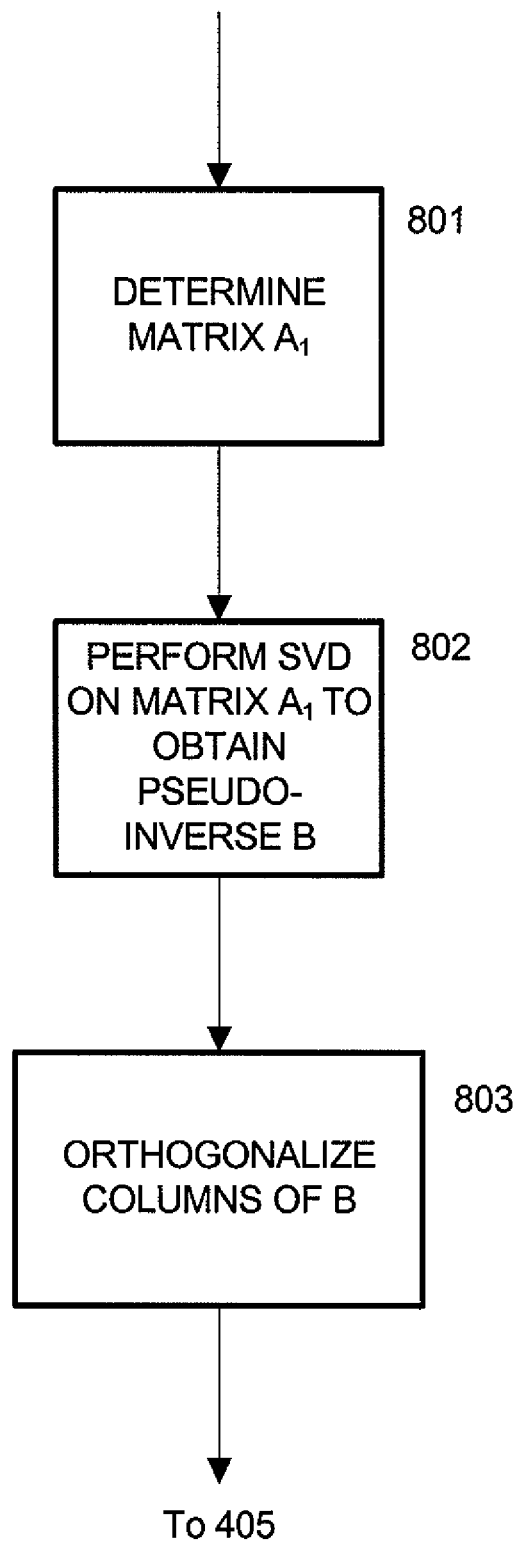
FIG. 8 is a process flowchart of one example method of decomposing a full spectral space according to one embodiment of the present invention.

FIG. 8 shows one example method that can be used for decomposing 404. First, a 3m×M matrix $A_1 = AC$ is determined (801), where A and C are the matrices described above, i.e., the matrix corresponding to a linear map from the full spectral space S to the direct sum of m copies of the XYZ spaces, and the matrix of spectral measurement data, respectively. Singular value decomposition (SVD) is performed (802) on $A_1$, to obtain a matrix decomposition:

$$A_1 = U_1 D_1 V_1^T$$

where: $U_1$ is a 3m×3m orthogonal matrix,
$D_1$ is a 3m×M "diagonal" matrix of singular values, and
$V_1$ is a M×M orthogonal matrix.
Furthermore, if:

$$D_1 = \begin{pmatrix} d_1 & 0 & \cdots & \cdots & \cdots & \cdots & 0 \\ 0 & d_2 & 0 & \cdots & \cdots & \cdots & 0 \\ \vdots & \ddots & \ddots & \ddots & & & \vdots \\ 0 & 0 & 0 & d_{3m} & 0 & \cdots & 0 \end{pmatrix}$$

and $r=\text{rank}(D_1)$, define $n=\min(n_0, r, N)$, then a $M \times 3m$ matrix $D_1^x$:

$$D_1^x = \begin{pmatrix} d_1^{-1} & 0 & \cdots & \cdots & \cdots & \cdots & 0 \\ 0 & d_2^{-1} & 0 & \cdots & \cdots & \cdots & 0 \\ \vdots & \ddots & \ddots & \ddots & & & \vdots \\ \vdots & & \ddots & d_n^{-1} & 0 & & \vdots \\ \vdots & & & 0 & 0 & \ddots & \vdots \\ \vdots & & & & & \ddots & 0 \\ 0 & \cdots & \cdots & \cdots & \cdots & 0 & 0 \end{pmatrix}$$

Because $n \leq r$, each of the $d_1, \ldots, d_n$ is non-zero and therefore invertible. As a result, the matrix B discussed above takes the following form:

$$B = CV_1 D_1^x U_1^T$$

It is noted that B need not be actually constructed at this point. Also, it is noted that because of the "zero-ing" operation done in $D_1^x$, B may not be strictly a pseudo-inverse of A. Nevertheless, it is still a pseudo-inverse when restricted to the subspace spanned by the first n singular vectors. In sum, the spectral reflectances are converted to XYZ's under the illuminants (resulting in matrix $A_1$), the r-dimensional space they span (which may be less than 3m if the illuminants are not independent) is considered, a further projection onto the dominant n-dimensional subspace (if $n_0 < r$) is made, then the projection is transformed back to the spectral space using the pseudo-inverse.

The columns of B are orthogonalized (803). This can be accomplished by utilizing, for example, one of a variety of known methods of orthogonalization. In the present example embodiment, orthogonalization is accomplished through SVD. In particular, the first n columns of the matrix product $CV_1$ are determined, and the resulting $N \times n$ matrix is denoted as $CV_1(*, 1 \ldots n)$. SVD is performed on $CV_1(*, 1 \ldots n)$, which results in a decomposition:

$$CV_1(*, 1 \ldots n) = U_2 D_2 V_2^T$$

The matrices $U_2, D_2, V_2$ have dimensions $N \times N$, $N \times n$, $n \times n$, respectively. Furthermore, $U_2, V_2$ are orthogonal matrices, and $D_2$ is a "diagonal matrix" with exactly n non-zero singular values. Now the first n columns of $U_2$ have the same span as the columns of B and are unit vectors mutually orthogonal to each other.

This decomposition is one example of how the full spectral space can be decomposed into a first subspace that minimizes a loss of a spectral component in the spectral measurement data under a projection along a second subspace onto the first subspace.

Referring again to FIG. 4, the ICS is generated (405) based on the first subspace. In the present example embodiment, an ICS is fully specified by (1) a subspace I of a full spectral space S, (2) a linear transformation P from S to I, and (3) a linear transformation from Q from I to S. For example, the ICS can be constructed based on the first n columns of $U_2$, which form an orthonormal basis for the ICS. In other words, the subspace is defined by the span of the first n columns of $U_2$. The ICS is denoted $I_n$, or $I_n(\Im_1, \ldots, \Im_m)$ if there is a need to emphasize the illuminants used in the optimization. Next, define $$Q = U_2(*, 1 \ldots n),$$

which is an $N \times n$ matrix that converts values in $I_n$ to spectra.

Finally, an $n \times N$ matrix P that converts spectra to values in $I_n$ can be determined as follows:

$$P = Q^T BA$$

or, using the following computationally more efficient form, which makes use of previously calculated $CV_1(*, 1 \ldots n)$:

$$P = Q^T (CV_1(*, 1 \ldots n)) \cdot (D_1^x U_1^T (1 \ldots n, *)) A$$

Example Calculations:

To illustrate construction of an ICS in one example embodiment of the invention, the following example calculation was performed. 729 spectral reflectance measurements were collected for the Canon i9900 inkjet printer using the Gretag Spectroscan, all starting at wavelength 380 nm and sampled at every 10 nm interval, ending at wavelength 730 nm (36 wavelength bands). We will be doing the calculation using the spectrally weighted spectral space. As we mentioned before, we could also have decided to use the unweighted spectral space. However, if we use the spectrally weighted spectral space, the ICS we are going to construct will also be a subspace of it. If subsequent gamut mapping is done inside the ICS, then the natural Euclidean distance on it is known to correlate better with the human perceptual color difference.

A Spectral Weighting Function was obtained for this sampling, as follows:

$\overline{W} = \text{diag}\{0.220760, 0.716623, 2.305731, 7.336433, 21.712286, 42.717907, 53.871849, 54.325405, 49.228741, 36.543606, 22.387672, 16.026230, 17.688272, 24.221445, 31.502956, 35.189285, 35.563198, 33.910046, 31.601578, 29.827597, 29.397827, 30.256771, 31.150187, 30.352978, 26.712053, 20.805098, 14.757836, 9.538306, 5.615265, 3.035526, 1.604729, 0.799840, 0.396151, 0.201922, 0.101494, 0.050327\}$ For the illuminants to be optimized, we will use CIE Standard Illuminant $D_{50}$ and Illuminant A. Using these information, we calculate the $6 \times 36$ matrix A ($A^T$ is displayed for formatting reason):

```
A^T =
[0.000120  0.000003  0.000567  0.000047  0.000001  0.000221]
[0.000220  0.000006  0.001039  0.000077  0.000002  0.000366]
[0.000311  0.000009  0.001478  0.000093  0.000003  0.000443]
[0.000355  0.000010  0.001697  0.000111  0.000003  0.000532]
[0.000367  0.000012  0.001769  0.000130  0.000004  0.000628]
[0.000378  0.000016  0.001849  0.000149  0.000007  0.000732]
[0.000448  0.000031  0.002256  0.000169  0.000012  0.000851]
[0.000502  0.000058  0.002652  0.000188  0.000022  0.000997]
[0.000500  0.000106  0.002871  0.000203  0.000044  0.001170]
[0.000468  0.000222  0.003070  0.000211  0.000101  0.001387]
[0.000394  0.000561  0.003290  0.000194  0.000283  0.001630]
[0.000193  0.001172  0.002644  0.000106  0.000666  0.001477]
[0.000037  0.001691  0.001427  0.000022  0.001041  0.000868]
[0.000051  0.001921  0.000610  0.000035  0.001287  0.000402]
[0.000200  0.002085  0.000243  0.000146  0.001508  0.000174]
[0.000458  0.002344  0.000118  0.000352  0.001790  0.000089]
[0.000791  0.002574  0.000057  0.000658  0.002130  0.000047]
[0.001242  0.002831  0.000027  0.001110  0.002519  0.000023]
[0.001791  0.002987  0.000012  0.001751  0.002907  0.000012]
[0.002387  0.002977  0.000007  0.002541  0.003158  0.000007]
[0.002890  0.002749  0.000005  0.003297  0.003125  0.000006]
[0.003053  0.002262  0.000003  0.003808  0.002815  0.000004]
[0.003135  0.001873  0.000002  0.004049  0.002418  0.000003]
[0.003090  0.001563  0.000001  0.004141  0.002092  0.000002]
[0.002981  0.001340  0.000001  0.004219  0.001894  0.000001]
[0.002857  0.001185  0.000000  0.004323  0.001792  0.000001]
[0.002841  0.001115  0.000000  0.004453  0.001748  0.000000]
[0.002774  0.001051  0.000000  0.004595  0.001740  0.000000]
[0.002802  0.001039  0.000000  0.004757  0.001764  0.000000]
```

-continued

| | | | | | |
|---|---|---|---|---|---|
| [0.002885 | 0.001058 | 0.000000 | 0.004928 | 0.001806 | 0.000000] |
| [0.002799 | 0.001018 | 0.000000 | 0.005102 | 0.001856 | 0.000000] |
| [0.002565 | 0.000928 | 0.000000 | 0.005271 | 0.001908 | 0.000000] |
| [0.002570 | 0.000928 | 0.000000 | 0.005444 | 0.001966 | 0.000000] |
| [0.002569 | 0.000928 | 0.000000 | 0.005614 | 0.002027 | 0.000000] |
| [0.002310 | 0.000834 | 0.000000 | 0.005779 | 0.002087 | 0.000000] |
| [0.001564 | 0.000565 | 0.000000 | 0.003919 | 0.001415 | 0.000000] |

When we form $A_1 = AC$ and perform SVD on it, we obtain a diagonal of 729 singular values:

18.272604, 5.052931, 2.194257, 0.089553, 0.022485, 0.005514, 0, 0, . . . (all trailing zeros)

This means that $r = \text{rank}(D_1) = 6$, which is not a surprise at all because illuminant $D_{50}$ and A are sufficiently distinct that their XYZ's should span separately 3 dimensions each.

Suppose we set our target ICS dimension $n_0$ to be 6. Then $n = \min(r, n_0, N) = 6$ and we do not need to zero out any of the non-zero singular values in $D_1$. Multiplying the spectral measurement matrix C to $V_1$ and taking the first 6 columns, we obtain

| $CV_1(*, 1 \ldots 6) =$ | | | | | |
|---|---|---|---|---|---|
| [−0.50456 | −0.246852 | −0.070689 | −0.016514 | 0.044469 | −0.015496] |
| [−2.051448 | −1.281591 | −0.431625 | 0.000981 | 0.264561 | −0.057437] |
| [−8.057646 | −6.115503 | −2.153643 | 0.319242 | 1.2785 | −0.215026] |
| [−33.600189 | −29.43642 | −10.077039 | 2.826297 | 5.640404 | −0.224146] |
| [−117.553764 | −112.403931 | −36.572632 | 12.472725 | 19.69401 | 0.230229] |
| [−245.046875 | −245.915863 | −73.019905 | 25.20237 | 35.772614 | 0.153576] |
| [−315.388947 | −325.326385 | −81.715797 | 25.518225 | 31.969431 | −0.294131] |
| [−312.995544 | −323.128693 | −61.423843 | 15.170579 | 12.763059 | −0.281719] |
| [−279.868378 | −279.914398 | −30.561249 | 2.153008 | −9.065256 | −0.134832] |
| [−207.22908 | −193.722687 | 0.51179 | −8.901023 | −22.348482 | −0.110879] |
| [−129.593018 | −107.591919 | 17.583561 | −12.85026 | −20.436064 | −0.287921] |
| [−97.511299 | −67.751892 | 26.997375 | −14.729443 | −15.143698 | −0.389015] |
| [−114.009178 | −62.532188 | 47.906921 | −21.647421 | −11.035478 | 0.241563] |
| [−163.847916 | −68.116806 | 89.504333 | −33.192879 | −0.67204 | 2.640476] |
| [−221.457428 | −67.808754 | 134.928619 | −38.338074 | 15.331587 | 4.983533] |
| [−254.53508 | −52.045715 | 152.099731 | −27.409447 | 23.533268 | 3.842314] |
| [−263.600922 | −25.688065 | 141.01532 | −6.460721 | 19.271467 | 0.742143] |
| [−254.154526 | 0.310585 | 113.710434 | 14.476941 | 7.837326 | −1.999409] |
| [−238.361221 | 18.301367 | 81.737259 | 28.826157 | −4.316172 | −3.444862] |
| [−233.211227 | 30.445341 | 49.288624 | 34.826916 | −13.162807 | −4.205061] |
| [−245.66832 | 41.696709 | 13.78634 | 30.548689 | −15.635313 | −4.527875] |
| [−272.128906 | 54.50901 | −23.583706 | 17.330587 | −11.880452 | −2.637748] |
| [−293.335968 | 65.862968 | −56.107101 | 1.117158 | −5.860325 | 3.37091] |
| [−293.62146 | 69.567924 | −74.641937 | −11.294058 | −0.56973 | 9.275918] |
| [−266.944336 | 62.795052 | −75.407692 | −16.907364 | 3.426587 | 8.870482] |
| [−216.859436 | 48.470493 | −62.621323 | −16.637098 | 5.65694 | 3.631995] |
| [−161.709518 | 33.422577 | −45.808243 | −13.629902 | 6.253842 | −1.661601] |
| [−109.164825 | 20.834587 | −29.918106 | −9.702335 | 5.378691 | −4.036742] |
| [−65.20401 | 12.322965 | −17.691761 | −5.90007 | 3.3875 | −2.924348] |
| [−34.54324 | 6.797629 | −9.600306 | −3.110444 | 1.625374 | −1.057729] |
| [−18.372362 | 3.346358 | −5.050398 | −1.695817 | 0.935582 | −0.677837] |
| [−9.769534 | 1.354055 | −2.415455 | −0.978981 | 0.702975 | −0.869434] |
| [−5.298435 | 0.48134 | −1.096293 | −0.59206 | 0.534395 | −0.845344] |
| [−2.930099 | 0.134737 | −0.501669 | −0.366672 | 0.374235 | −0.642285] |
| [−1.564197 | 0.007738 | −0.223841 | −0.217555 | 0.232927 | −0.408571] |
| [−0.81446 | −0.025988 | −0.097367 | −0.124347 | 0.134603 | −0.236497] |
| $D_1 * U_1^T (1 \ldots 6, *) =$ | | | | | |
| [−0.025059 | −0.024011 | −0.014299 | −0.030307 | −0.025076 | −0.006227] |
| [0.021811 | 0.001138 | −0.171944 | 0.058839 | 0.021923 | −0.071987] |
| [−0.135791 | 0.304149 | −0.070409 | −0.242774 | 0.180886 | −0.011505] |
| [7.289081 | −3.453615 | 0.814760 | −5.858090 | 3.510399 | −3.511291] |
| [−7.177018 | 8.930556 | 16.231561 | 6.051208 | −8.407808 | −38.417495] |
| [88.343145 | 86.236832 | −21.836062 | −30.031624 | −126.391885 | 17.247882] |

Applying SVD to $CV_1(*, 1 \ldots 6)$ and taking the first 6 columns of $U_2$ gives

| Q = | | | | | |
|---|---|---|---|---|---|
| [−0.000468 | −0.000121 | −0.000178 | 0.000261 | −0.000421 | 0.001814] |
| [−0.001986 | −0.000990 | −0.001005 | 0.000555 | −0.002741 | 0.006719] |
| [−0.008116 | −0.005796 | −0.004767 | −0.000420 | −0.013605 | 0.023706] |
| [−0.034993 | −0.030902 | −0.021411 | −0.014534 | −0.060048 | 0.030714] |
| [−0.125177 | −0.123744 | −0.074813 | −0.073425 | −0.206520 | −0.003042] |
| [−0.264271 | −0.275261 | −0.141910 | −0.147947 | −0.352009 | −0.007228] |
| [−0.342579 | −0.363560 | −0.144142 | −0.133740 | −0.253634 | 0.009866] |
| [−0.339920 | −0.353648 | −0.087683 | −0.051116 | 0.010854 | −0.009569] |
| [−0.301196 | −0.292564 | −0.014234 | 0.043397 | 0.288520 | −0.033358] |
| [−0.219019 | −0.186402 | 0.048200 | 0.113505 | 0.423977 | −0.020830] |
| [−0.133054 | −0.088796 | 0.072436 | 0.126828 | 0.349462 | 0.028527] |
| [−0.096383 | −0.041162 | 0.087140 | 0.133504 | 0.255453 | 0.074424] |

-continued

| | | | | | |
|---|---|---|---|---|---|
| [−0.108073 | −0.016485 | 0.139992 | 0.187969 | 0.201015 | 0.092782] |
| [−0.149413 | 0.016844 | 0.248467 | 0.278434 | 0.070722 | 0.024733] |
| [−0.195305 | 0.064826 | 0.361907 | 0.302223 | −0.141367 | −0.072641] |
| [−0.217075 | 0.114105 | 0.392743 | 0.178038 | −0.262177 | −0.047589] |
| [−0.216448 | 0.157722 | 0.344203 | −0.031837 | −0.224346 | 0.010105] |
| [−0.201094 | 0.185201 | 0.255184 | −0.230392 | −0.090817 | 0.017036] |
| [−0.182992 | 0.194950 | 0.159730 | −0.356619 | 0.057982 | −0.021136] |
| [−0.174960 | 0.201647 | 0.065344 | −0.395651 | 0.168739 | −0.015612] |
| [−0.181035 | 0.216489 | −0.038149 | −0.325879 | 0.198645 | 0.095828] |
| [−0.197692 | 0.241612 | −0.148219 | −0.160009 | 0.146242 | 0.153326] |
| [−0.210720 | 0.262805 | −0.242726 | 0.037777 | 0.061705 | −0.092765] |
| [−0.209691 | 0.263492 | −0.292247 | 0.185937 | −0.011656 | −0.400804] |
| [−0.190714 | 0.236561 | −0.284519 | 0.243610 | −0.061588 | −0.306799] |
| [−0.155678 | 0.187599 | −0.232922 | 0.224866 | −0.083788 | 0.083964] |
| [−0.116904 | 0.135689 | −0.169633 | 0.174751 | −0.084827 | 0.437145] |
| [−0.079441 | 0.089062 | −0.110797 | 0.119116 | −0.069614 | 0.540416] |
| [−0.047488 | 0.053046 | −0.065601 | 0.071487 | −0.043451 | 0.366084] |
| [−0.025075 | 0.028478 | −0.035513 | 0.038432 | −0.021248 | 0.153441] |
| [−0.013416 | 0.014728 | −0.018602 | 0.020722 | −0.012019 | 0.091530] |
| [−0.007263 | 0.007219 | −0.008931 | 0.011055 | −0.008532 | 0.091243] |
| [−0.004016 | 0.003565 | −0.004122 | 0.006048 | −0.006259 | 0.080813] |
| [−0.002261 | 0.001788 | −0.001921 | 0.003476 | −0.004309 | 0.059466] |
| [−0.001226 | 0.000863 | −0.000870 | 0.001975 | −0.002657 | 0.037371] |
| [−0.000648 | 0.000407 | −0.000384 | 0.001102 | −0.001525 | 0.021523] |

Finally, forming the matrix product $Q^T(CV_1(*,1 \ldots 6)) \cdot (D_1^x U_1^T(1 \ldots 6,*))A$ gives

| $P^T =$ | | | | | |
|---|---|---|---|---|---|
| [−0.067288 | −0.065854 | −0.027525 | −0.016933 | −0.013954 | −0.009614] |
| [−0.153689 | −0.151421 | −0.048221 | −0.050822 | −0.132932 | −0.011369] |
| [−0.277562 | −0.275091 | −0.064305 | −0.110758 | −0.397185 | −0.003955] |
| [−0.300331 | −0.298381 | −0.074110 | −0.116462 | −0.392922 | −0.005967] |
| [−0.256236 | −0.255139 | −0.079335 | −0.085835 | −0.211802 | −0.014225] |
| [−0.210246 | −0.210280 | −0.083469 | −0.052874 | −0.022133 | −0.021743] |
| [−0.288728 | −0.290751 | −0.093066 | −0.082268 | −0.145398 | −0.013830] |
| [−0.343049 | −0.349403 | −0.095670 | −0.094302 | −0.194450 | −0.001820] |
| [−0.302800 | −0.316199 | −0.084264 | −0.053027 | 0.012790 | 0.009391] |
| [−0.228000 | −0.243220 | −0.053982 | 0.029169 | 0.334272 | 0.019526] |
| [−0.172753 | −0.160655 | 0.028084 | 0.175404 | 0.618013 | 0.022940] |
| [−0.091700 | −0.005729 | 0.185295 | 0.342222 | 0.725347 | 0.016476] |
| [−0.115469 | 0.061348 | 0.312720 | 0.375987 | 0.296935 | −0.005594] |
| [−0.145400 | 0.070600 | 0.351682 | 0.274665 | −0.037684 | 0.003636] |
| [−0.172028 | 0.075114 | 0.346261 | 0.168976 | −0.190623 | 0.001982] |
| [−0.212412 | 0.101973 | 0.325908 | 0.130462 | −0.252959 | −0.054042] |
| [−0.214577 | 0.124886 | 0.299474 | −0.008338 | −0.195053 | −0.029015] |
| [−0.222361 | 0.160524 | 0.253135 | −0.131979 | −0.116878 | −0.024261] |
| [−0.199281 | 0.189770 | 0.186986 | −0.315089 | 0.031566 | 0.047328] |
| [−0.177931 | 0.221227 | 0.085315 | −0.422117 | 0.162127 | 0.087840] |
| [−0.185212 | 0.256650 | −0.049168 | −0.340453 | 0.193145 | 0.014335] |
| [−0.152113 | 0.237288 | −0.130912 | −0.262883 | 0.194783 | 0.060152] |
| [−0.197178 | 0.260025 | −0.236957 | 0.022904 | 0.072226 | −0.139848] |
| [−0.215954 | 0.257808 | −0.285740 | 0.207651 | −0.021312 | −0.230277] |
| [−0.193947 | 0.223632 | −0.271784 | 0.251037 | −0.062261 | −0.152497] |
| [−0.149400 | 0.171903 | −0.221058 | 0.210919 | −0.073160 | 0.025769] |
| [−0.136031 | 0.151057 | −0.203569 | 0.222307 | −0.096190 | 0.096506] |
| [−0.094825 | 0.106214 | −0.149854 | 0.158410 | −0.093801 | 0.276860] |
| [−0.080867 | 0.089304 | −0.130730 | 0.143792 | −0.100780 | 0.355730] |
| [−0.082517 | 0.088881 | −0.132249 | 0.156286 | −0.111717 | 0.375271] |
| [−0.017973 | 0.025759 | −0.048723 | 0.021042 | −0.082238 | 0.650077] |
| [0.101709 | −0.089931 | 0.106199 | −0.236424 | −0.019980 | 1.137379] |
| [0.133773 | −0.120967 | 0.147372 | −0.305057 | −0.005883 | 1.286327] |
| [0.168312 | −0.153929 | 0.191352 | −0.380745 | 0.011125 | 1.443841] |
| [0.299486 | −0.279506 | 0.360398 | −0.667978 | 0.083785 | 1.973967] |
| [0.204135 | −0.190541 | 0.245745 | −0.455261 | 0.057404 | 1.342750] |

With matrices P and Q we can convert between the 36-dimensional weighted spectral space and the ICS $I_6$.

If we had decided to have a target ICS dimension of 5 instead of 6, then

```
CV₁(*, 1 ... 5) =
[ -0.504560      -0.246852     -0.070689    -0.016514     0.044469]
[ -2.051448      -1.281591     -0.431625     0.000981     0.264561]
[ -8.057646      -6.115503     -2.153643     0.319242     1.278500]
[-33.600189     -29.436420    -10.077039     2.826297     5.640404]
[-117.553764   -112.403931    -36.572632    12.472725    19.694010]
[-245.046875   -245.915863    -73.019905    25.202370    35.772614]
[-315.388947   -325.326385    -81.715797    25.518225    31.969431]
[-312.995544   -323.128693    -61.423843    15.170579    12.763059]
[-279.868378   -279.914398    -30.561249     2.153008    -9.065256]
[-207.229080   -193.722687      0.511790    -8.901023   -22.348482]
[-129.593018   -107.591919     17.583561   -12.850260   -20.436064]
[ -97.511299    -67.751892     26.997375   -14.729443   -15.143698]
[-114.009178    -62.532188     47.906921   -21.647421   -11.035478]
[-163.847916    -68.116806     89.504333   -33.192879    -0.672040]
[-221.457428    -67.808754    134.928619   -38.338074    15.331587]
[-254.535080    -52.045715    152.099731   -27.409447    23.533268]
[-263.600922    -25.688065    141.015320    -6.460721    19.271467]
[-254.154526      0.310585    113.710434    14.476941     7.837326]
[-238.361221     18.301367     81.737259    28.826157    -4.316172]
[-233.211227     30.445341     49.288624    34.826216   -13.162807]
[-245.668320     41.696709     13.786340    30.548689   -15.635313]
[-272.128906     54.509010    -23.583706    17.330587   -11.880452]
[-293.335968     65.862968    -56.107101     1.117158    -5.860325]
[-293.621460     69.567924    -74.641937   -11.294058    -0.569730]
[-266.944336     62.795052    -75.407692   -16.907364     3.426587]
[-216.859436     48.470493    -62.621323   -16.637098     5.656940]
[-161.709518     33.422577    -45.808243   -13.629902     6.253842]
[-109.164825     20.834587    -29.918106    -9.702335     5.378691]
[ -65.204010     12.322965    -17.691761    -5.900070     3.387500]
[ -34.543240      6.797629     -9.600306    -3.110444     1.625374]
[ -18.372362      3.346358     -5.050398    -1.695817     0.935582]
[  -9.769534      1.354055     -2.415455    -0.978981     0.702975]
[  -5.298435      0.481340     -1.096293    -0.592060     0.534395]
[  -2.930099      0.134737     -0.501669    -0.366672     0.374235]
[  -1.564197      0.007738     -0.223841    -0.217555     0.232927]
[  -0.814460     -0.025988     -0.097367    -0.124347     0.134603]
D₁*U₁ᵀ(1 ... 5, *) =
[-0.025059   -0.014299  -0.030307  -0.025076  -0.006227]
[ 0.021811    0.001138  -0.171944   0.058839   0.021923  -0.071987]
[-0.135791    0.304149  -0.070409  -0.242774   0.180886  -0.011505]
[ 7.289081   -3.453615   0.814760  -5.858090   3.510399  -3.511291]
[-7.177018    8.930556  16.231561   6.051208  -8.407808 -38.417495]
```

These then give:

```
Q =
[-0.000468   -0.000121  -0.000179  -0.000284  -0.000442]
[-0.001986   -0.000990  -0.001006  -0.000625  -0.002812]
[-0.008116   -0.005794  -0.004771   0.000220  -0.013826]
[-0.034994   -0.030900  -0.021415   0.014765  -0.060169]
[-0.125178   -0.123745  -0.074810   0.075852  -0.205627]
[-0.264273   -0.275262  -0.141907   0.152112  -0.350205]
[-0.342583   -0.363555  -0.144145   0.136514  -0.252165]
[-0.339924   -0.353643  -0.087683   0.051133   0.011535]
[-0.301199   -0.292559  -0.014230  -0.046222   0.288315]
[-0.219021   -0.186397   0.048203  -0.118077   0.422834]
[-0.133056   -0.088790   0.072434  -0.131276   0.347701]
[-0.096385   -0.041155   0.087135  -0.137548   0.253187]
[-0.108074   -0.016482   0.140000  -0.191637   0.197957]
[-0.149408    0.016829   0.248521  -0.279525   0.067297]
[-0.195295    0.064795   0.362005  -0.299356  -0.144104]
[-0.217068    0.114087   0.392813  -0.174165  -0.263712]
[-0.216448    0.157733   0.344205   0.034347  -0.224032]
[-0.201100    0.185236   0.255123   0.231186  -0.088312]
[-0.183001    0.194997   0.159636   0.356210   0.062278]
[-0.174971    0.201699   0.065229   0.393841   0.173411]
[-0.181047    0.216543  -0.038275   0.322030   0.201437]
[-0.197698    0.241648  -0.148315   0.155905   0.146575]
[-0.210714    0.262786  -0.242711  -0.037184   0.062119]
[-0.209671    0.263419  -0.292120  -0.179839  -0.009995]
[-0.190695    0.236490  -0.284395  -0.238330  -0.061481]
[-0.155670    0.187574  -0.232888  -0.225194  -0.087192]
[-0.116908    0.135709  -0.169690  -0.180371  -0.091024]
[-0.079450    0.089102  -0.110889  -0.126457  -0.076154]
[-0.047495    0.053075  -0.065666  -0.076501  -0.047775]
[-0.025078    0.028489  -0.035538  -0.040500  -0.023158]
[-0.013418    0.014735  -0.018617  -0.021963  -0.013133]
[-0.007265    0.007227  -0.008949  -0.012331  -0.009531]
[-0.004018    0.003573  -0.004139  -0.007192  -0.007101]
[-0.002262    0.001794  -0.001934  -0.004321  -0.004917]
[-0.001227    0.000867  -0.000878  -0.002507  -0.003036]
[-0.000648    0.000409  -0.000388  -0.001408  -0.001744]
Pᵀ =
[-0.064811   -0.068147  -0.025637   0.026224  -0.010481]
[-0.150598   -0.154284  -0.045860   0.063750  -0.128248]
[-0.275998   -0.276543  -0.063099   0.121103  -0.393815]
[-0.298274   -0.300288  -0.072528   0.128573  -0.388835]
[-0.252345   -0.258743  -0.076363   0.102620  -0.205650]
[-0.204726   -0.215390  -0.079263   0.073480  -0.014216]
[-0.285090   -0.294119  -0.090289   0.097362  -0.139622]
[-0.342476   -0.349934  -0.095227   0.098671  -0.192584]
[-0.305499   -0.313698  -0.086323   0.042957   0.009845]
[-0.233809   -0.237837  -0.058420  -0.054393   0.326253]
[-0.179571   -0.154339   0.022886  -0.207608   0.606954]
[-0.096434   -0.001348   0.181709  -0.367979   0.715104]
```

-continued

| | | | | |
|---|---|---|---|---|
| [−0.113258 | 0.059288 | 0.314465 | −0.371224 | 0.295493] |
| [−0.145182 | 0.070386 | 0.351909 | −0.273390 | −0.040572] |
| [−0.171422 | 0.074546 | 0.346770 | −0.164508 | −0.191765] |
| [−0.197176 | 0.087860 | 0.337568 | −0.071368 | −0.234309] |
| [−0.206568 | 0.117478 | 0.305587 | 0.040143 | −0.184344] |
| [−0.216274 | 0.154907 | 0.257748 | 0.155807 | −0.107276] |
| [−0.212976 | 0.202487 | 0.176464 | 0.264321 | 0.017138] |
| [−0.202944 | 0.244432 | 0.066129 | 0.328131 | 0.133971] |
| [−0.190773 | 0.261835 | −0.053509 | 0.317743 | 0.189743] |
| [−0.169327 | 0.253253 | −0.144120 | 0.197179 | 0.175060] |
| [−0.160722 | 0.226267 | −0.209174 | 0.110507 | 0.120126] |
| [−0.154916 | 0.201271 | −0.239168 | 0.017379 | 0.056933] |
| [−0.152947 | 0.185642 | −0.240475 | −0.099378 | −0.011014] |
| [−0.155085 | 0.177143 | −0.225351 | −0.231150 | −0.083168] |
| [−0.160087 | 0.173305 | −0.221864 | −0.309965 | −0.130618] |
| [−0.166239 | 0.172316 | −0.204269 | −0.420586 | −0.190097] |
| [−0.172917 | 0.174514 | −0.200882 | −0.481926 | −0.224190] |
| [−0.179593 | 0.178743 | −0.206229 | −0.512818 | −0.241917] |
| [−0.187423 | 0.182645 | −0.177913 | −0.644569 | −0.306547] |
| [−0.196174 | 0.185896 | −0.120972 | −0.861015 | −0.411090] |
| [−0.203314 | 0.191166 | −0.109704 | −0.936991 | −0.448025] |
| [−0.210250 | 0.196613 | −0.097364 | −1.014315 | −0.484971] |
| [−0.218837 | 0.200468 | −0.034942 | −1.242847 | −0.593739] |
| [−0.148449 | 0.135955 | −0.023181 | −0.844559 | −0.403463] | which effect the transformations between the 36-dimensional weighted spectral space and ICS $I_5$.

Optional Transformation into Constrained Version of ICS

The foregoing example methods of generating ICSs based on a set of illuminants can provide ICSs optimized for a plurality of illuminants. In many applications, the foregoing ICSs can provide increased accuracy over a plurality of illuminants, while maintaining sufficient accuracy on other illuminants.

In addition, an optional transformation can be applied to the foregoing ICSs. This optional transformation can provide further benefits in some applications. For example, the example printer workflow shown in FIG. 3 includes a spectral gamut mapping sG (313) that takes place in an ICS $I_n$ generated by one of the foregoing example methods. If spectral gamut mapping 313 has an underlying structure, such as

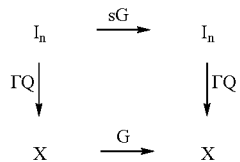

for some space X, "lower layer" gamut mapping $G: X \to X$, and linear transformation $\Gamma: S \to X$, an optional modification of $I_n$ might prove beneficial, as explained in more detail below.

For example, X can be the XYZ space under illuminant D50, and $\Gamma$ can be the Standard Observer under illuminant D50. The map G can be a gamut mapping on the calorimetric level. In general, map G need not be linear and, in fact, can be of arbitrary complexity and construction. For example, G may have been constructed in some other space related to X but not X itself. In the XYZ example, G could have been constructed in a space such as, for example, CIELAB space or CAM space. For example, the space X can be D50 XYZ, and G can be a "hue-preserving minimum distance mapping" in LAB space, as shown below:

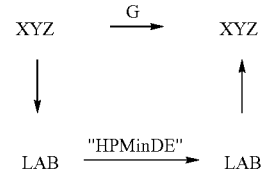

In another example, the linear map $\Gamma$ is based on spectral sensitivity curves of sensors. In general, a sensitivity curve $\rho(\lambda)$ gives rise to a linear function from S to real numbers:

$$x(\lambda) \mapsto \int x(\lambda) \rho(\lambda) d\lambda$$

For example, a trichromatic sensor has three sensitivity curves, and consequently, space X is a 3-dimensional space of sensor responses. One example of the sensitivity curves is the Standard Observer under a particular illuminant. In this case, if the spectral power distribution (SPD) of the illuminant is $I(\lambda)$, then the three curves $\bar{x}(\lambda)I(\lambda)$, $\bar{y}(\lambda)I(\lambda)$, $\bar{z}(\lambda)I(\lambda)$ give rise to a space X, which is the CIEXYZ space. At the other extreme, $\rho(\lambda)$ could be an impulse function located at a wavelength. For example, say three wavelengths $\lambda_1$, $\lambda_2$, $\lambda_3$ are chosen, then the linear map $\Gamma$ can be the operation of "taking the values at these wavelengths", i.e., $$\Gamma(x) = (x(\lambda_1), x(\lambda_2), x(\lambda_3))^T$$

These wavelengths could, for instance, be chosen to correspond to the local maxima of the CIE Color Matching Functions $\bar{x}(\lambda)$, $\bar{y}(\lambda)$, $\bar{z}(\lambda)$. This map could be interesting because it is independent of the illuminant, unlike the linear map into XYZ described above.

When the spectral gamut mapping has an underlying structure described above, it is possible to perform a second construction on the original ICS $I_n$ to give a new ICS $CI_n$. The new ICS is said to be a Constrained ICS relative to the linear map $\Gamma$. In contrast, the original ICS may be called "unconstrained". The Constrained ICS has the advantage that points of $I_n$ that are constant along the linear map $\Gamma$ are characterized as coordinate planes in $CI_n$. This property leads to great ease in geometric computation of spectral gamut mapping sG.

One example embodiment of the invention will now be described with reference to FIGS. 9 and 10. This example embodiment illustrates one method of constructing an $I_n$ "constrained by linear map $\Gamma$". The linear map $\Gamma$ is assumed to have full rank, i.e., the image of the map has the same dimension as the space X.

Figure 9:
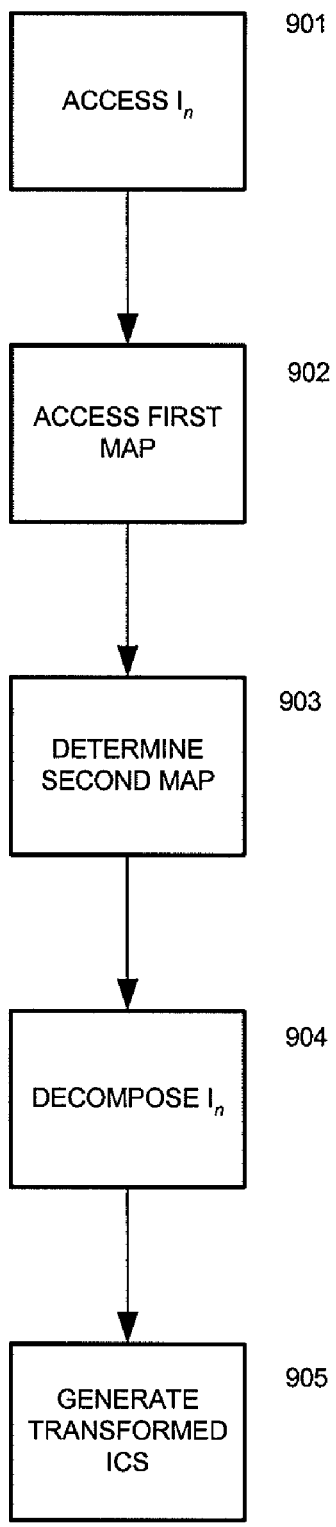
FIG. 9 is a process flowchart of one example method of generating a transformed $I_n$ according to one example embodiment of the present invention.

Referring now to FIG. 9, an $I_n$ of an N-dimensional full spectral space S is accessed (901). The $I_n$ is an n-dimensional ICS of S. The $I_n$ includes associated linear transformations to and from the full spectral space S:

$$P: S \to I_n$$

$$Q: I_n \to S$$

A "constraining" linear map $\Gamma$ is accessed (902). The linear map $\Gamma: S \to X$ goes from S to a k-dimensional space X. The rank of $\Gamma$ is k in this example embodiment. For example, X can be the 3-dimensional CIEXYZ space, and $\Gamma$ can be the operation of spectral integration of the spectral reflectance with the SPD of a chosen illuminant.

A second linear transformation from $I_n$ to X is determined by composing the two linear transformations:

$$I_n \xrightarrow{Q} S \xrightarrow{\Gamma} X$$

From this sequence of linear transformations, an overall linear transformation from $I_n$ to X, which is represented as a k×n matrix, $M_\Gamma$, is determined (903). $I_n$ is decomposed (904) into a direct sum of two orthogonal subspaces; a subspace C of "constrained variables", and a subspace B of "free variables". Because the rank of $\Gamma$ is k, which is also the dimension of X in this example embodiment, then the dimension of C is also k, and the dimension of B is n−k. The null space of matrix $M_\Gamma$ is the subspace B. In other words, $$B = \{p \in I_n | M_\Gamma p = 0\}$$

For example, if X is CIEXYZ space, then subspace B is a metameric black space of XYZ space. Subspace C is the orthogonal complement of B in $I_n$. Note that the determination of C depends on the inner product on $I_n$, whereas the determination of B does not.

One example method of decomposing $I_n$ into subspace B and subspace C includes performing an orthogonal transformation on space $I_n$, i.e., change of coordinates. An orthogonal transformation can be performed, for example, using eigenvalue analysis, such as SVD. Under the transformed coordinate system, the projections onto B and C are projections onto the coordinate planes of the transformed space, $CI_n$.

In the present example embodiment, the orthogonal transformation on $I_n$ is performed through SVD on the matrix $M_\Gamma$. Namely:

$$M_\Gamma = U_\Gamma D_\Gamma V_\Gamma^T$$

where $U_\Gamma$ and $V_\Gamma$ are k×k, resp. n×n orthogonal matrices, and $D_\Gamma$ is an k×n "diagonal" matrix of singular values sorted in non-increasing order and is of the form:

$$D_\Gamma = (\tilde{D}_\Gamma \ \vdots \ 0)$$

where $\tilde{D}_\Gamma$ is a k×k diagonal matrix.

Subspace B and subspace C are used to generate (905) a constrained ICS, denoted $CI_n$. In particular, maps characterizing orthogonal transformations (1) from the transformed ICS $CI_n$ to the ICS $I_n$ and (2) from the ICS $I_n$ to the transformed ICS $CI_n$ are determined. $V_\Gamma$ and $V_\Gamma^T$ are the desired orthogonal transformation for space $I_n$, because under this coordinate transformation, $$\begin{pmatrix} c_1 \\ \vdots \\ c_k \\ b_1 \\ \vdots \\ b_{n-k} \end{pmatrix} = V_\Gamma^T \begin{pmatrix} p_1 \\ \vdots \\ p_n \end{pmatrix},$$

so that $M_\Gamma p = U_\Gamma \tilde{D}_\Gamma (c_1 \ldots c_k)^T$. In other words, only the first k coordinates are used to determine the output of $M_\Gamma$, and they provide the coordinates for the subspace C, whereas $b_1, \ldots, b_{n-k}$ provide coordinates for the subspace B.

Further, maps characterizing linear transformations (1) from full spectral space S to the transformed ICS $CI_n$ and (2) from the transformed ICS $CI_n$ to full spectral space S can be determined. This example construction of a constrained ICS, $CI_n$, results in the following equations that give the transformations going to and from S and X.

From S to $CI_n$: $x \mapsto V_\Gamma^T P x = c \oplus b$

From $CI_n$ to S: $c \oplus b \mapsto Q V_\Gamma (c \oplus b)$

The subspace C can be identified with X because they are related by a non-singular linear transformation, i.e., a non-singular square matrix of dimension k.

$$C \to X$$

$$c \mapsto U_\Gamma \tilde{D}_\Gamma c$$

Since $\Gamma$ is assumed to have full rank, the singular values in $\tilde{D}_\Gamma$ are all non-zero, so that it is invertible.

$$X \to C$$

$$\xi \mapsto \tilde{D}_\Gamma^{-1} U_\Gamma^T \xi$$

Figure 10:
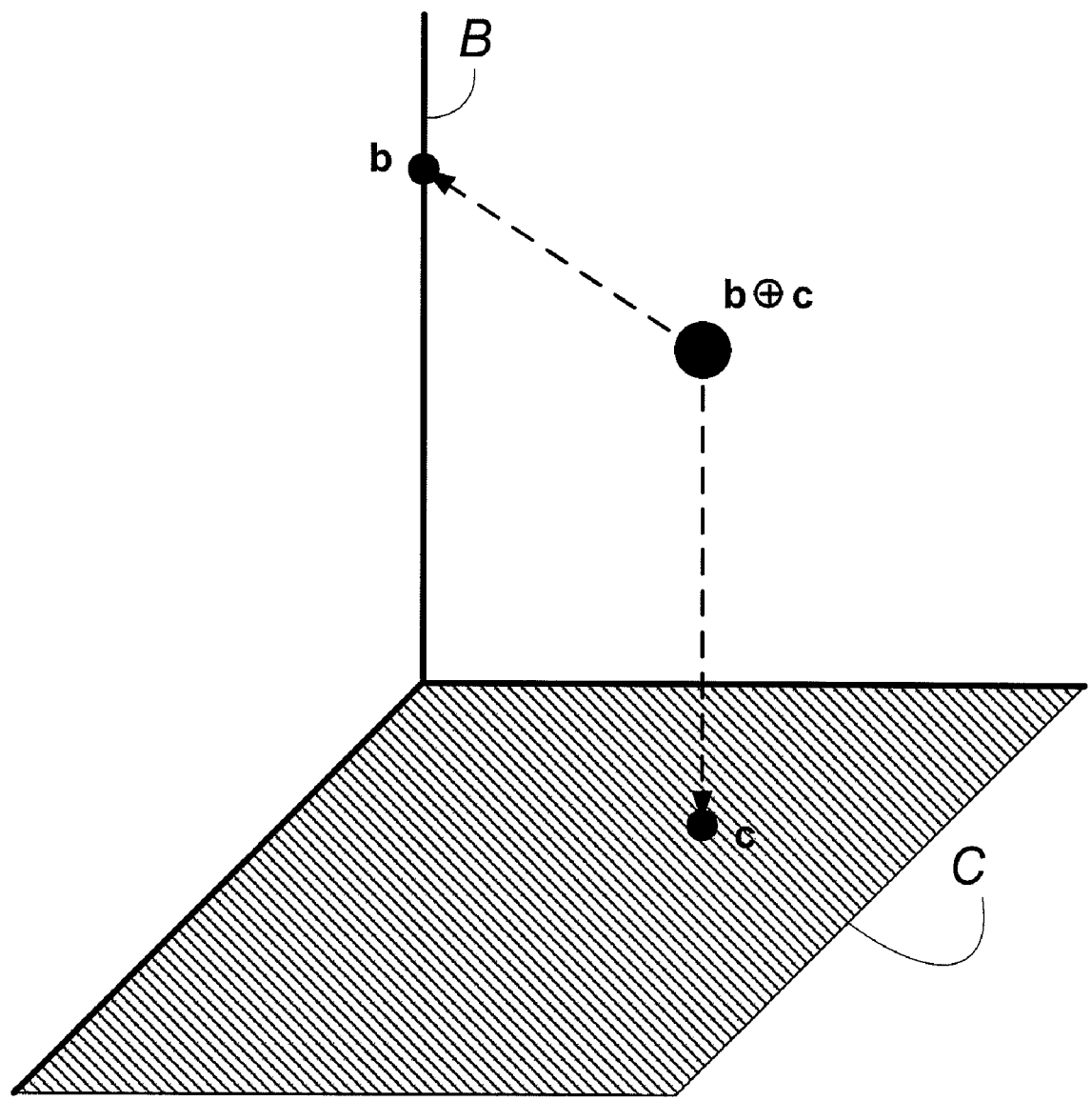
FIG. 10 is a illustrative graph showing a geometry of an example constrained $I_n$.

FIG. 10 is a graph of an example geometry of a $CI_n$. The example geometry is primarily for illustrative purposes, and shows a two-dimensional C subspace and a one-dimensional B subspace. The direct sum c⊕b of sub space C and subspace B is also illustrated.

Although the invention has been described in certain specific embodiments, many additional modifications and variations would be apparent to those skilled in the art. It is therefore to be understood that this invention may be practiced otherwise than as specifically described. Thus, the present embodiments of the invention should be considered in all respects as illustrative and not restrictive, the scope of the invention to be determined by any claims supportable by this application and the claims' equivalents rather than the foregoing description.

What is claimed is:

1. A method for generating an Interim Connection Space for spectral data in a fall spectral space, the method comprising:
    accessing a set of linear maps, each linear map characterizing a linear transformation from the full spectral space to a calorimetric space;
    accessing spectral measurement data in the full spectral space;
    decomposing the full spectral space into a first subspace that minimizes a loss of a spectral component in the spectral measurement data under a projection along a second subspace onto the first subspace, wherein the second subspace is a null subspace of the set of linear maps; and
    generating the Interim Connection Space based on the first subspace.

2. The method of claim 1, wherein the first subspace is characterized by a linear function from a direct sum of calorimetric spaces to the fall spectral space that is a least squares fit of the spectral measurement data.

3. The method of claim 2, wherein the linear function corresponds to a matrix pseudo-inverse obtained by singular value decomposition, and decomposing the fall spectral space comprises:
    defining the first subspace to be the span of singular vectors that correspond to only non-zero singular values.

4. The method of claim 1, further comprising:
    accessing an upper bound for the dimension value, and
    wherein decomposing the full spectral space comprises further restricting the dimension of the first subspace to the upper bound for the dimension value.

5. The method of claim 1, wherein the Interim Connection Space comprises a linear map characterizing a linear transformation from the Interim Connection Space to the full spectral space, and a linear map characterizing a linear transformation from the full spectral space to the Interim Connection Space.

6. The method of claim 1, wherein decomposing the full spectral space comprises:
transforming the spectral measurement data into calorimetric data using the set of linear maps;
decomposing the colorimetric data to obtain a basis of the colorimetric data;
transforming the basis of the calorimetric data to obtain a basis of the Interim Connection Space.

7. A method for generating an Interim Connection Space, the method comprising:
accessing a set of illuminants;
accessing spectral measurement data as a first matrix;
transforming the spectral measurement data under the set of illuminants to obtain a second matrix, which comprises transformed spectral measurement data;
decomposing the second matrix to obtain a third matrix of pseudo-inverse;
orthogonalizing the column vectors of the third matrix to obtain a fourth matrix, which characterizes an orthonormal basis; and
generating the Interim Connection Space based on the fourth matrix.

8. The method of claim 7, further comprising:
accessing an upper bound for the dimension value; and
wherein decomposing the second matrix comprises restricting the dimension of the range space of the third matrix to the upper bound for the dimension value.

9. The method of claim 7, wherein the Interim Connection Space comprises a linear map characterizing a linear transformation from the Interim Connection Space to the full spectral space, and a linear map characterizing a linear transformation from the full spectral space to the Interim Connection Space.

10. The method of claim 7, wherein the set of illuminants comprises spectral power distributions of each illuminant.

11. An apparatus for generating an Interim Connection Space, the apparatus comprising:
an access unit that accesses spectral measurement data and a set of linear maps, each linear map characterizing a linear transformation from a full spectral space to a colorimetric space;
a decomposition unit that decomposes the full spectral space into a first subspace that minimizes a loss of a spectral component in the spectral measurement data under a projection along a second subspace onto the first subspace, wherein the second subspace is a null subspace of the set of linear maps; and
a generation unit that generates the Interim Connection Space based on the first subspace.

12. The apparatus of claim 11, wherein the first subspace is characterized by a linear function from a direct sum of calorimetric spaces to the full spectral space that is a least squares fit of the spectral measurement data.

13. The apparatus of claim 12, wherein the linear function corresponds to a matrix pseudo-inverse obtained by singular value decomposition, and decomposing of the full spectral space by the decomposition unit comprises:
defining the first subspace to be the span of singular vectors that correspond to only non-zero singular values.

14. The apparatus of claim 11, wherein the access unit further accesses an upper bound for the dimension value, and the decomposing of the full spectral space by the decomposition unit comprises further restricting the dimension of the first subspace to the upper bound for the dimension value.

15. The apparatus of claim 11, wherein the Interim Connection Space comprises a linear map characterizing a linear transformation from the Interim Connection Space to the full spectral space, and a linear map characterizing a linear transformation from the full spectral space to the Interim Connection Space.

16. The apparatus of claim 11, wherein decomposing of the fall spectral space by the decomposition unit comprises:
transforming the spectral measurement data into colorimetric data using the set of linear maps;
decomposing the calorimetric data to obtain a basis of the colorimetric data;
transforming the basis of the colorimetric data to obtain a basis of the Interim Connection Space.

17. An apparatus for generating an Interim Connection Space, the apparatus comprising:
an access unit that accesses spectral measurement data as a first matrix and a set of illuminants;
a transformation unit that transforms the spectral measurement data under the set of illuminants to obtain a second matrix, which comprises transformed spectral measurement data;
a first decomposition unit that decomposes the second matrix to obtain a third matrix of pseudo-inverse;
a first orthogonalization unit that orthogonalizes the column vectors of the third matrix to obtain a fourth matrix, which characterizes an orthonormal basis; and
a generation unit that generates the Interim Connection Space based on the fourth matrix.

18. The apparatus of claim 17, wherein the access unit further accesses an upper bound for the dimension value, and decomposing of the second matrix by the first decomposition unit comprises further restricting the dimension of the range space of the third matrix to the upper bound for the dimension value.

19. The apparatus of claim 17, wherein the Interim Connection Space comprises a linear map characterizing a linear transformation from the Interim Connection Space to the full spectral space, and a linear map characterizing a linear transformation from the full spectral space to the Interim Connection Space.

20. The apparatus of claim 17, wherein the set of illuminants comprises spectral power distributions of each illuminant.

21. Computer-executable instructions stored on a non-transitory computer-readable medium, the computer-executable instructions executable to generate an Interim Connection Space, said computer-executable process steps comprising process steps executable to perform a method according to any of claims 1 to 10.

22. An apparatus for generating an Interim Connection Space, the apparatus comprising:
a program memory that stores process steps executable to perform a method according to any of claims 1 to 10; and
a processor coupled to the program memory that executes the process steps stored in said program memory.

23. A method of rendering source image data on a destination device, the method comprising:
accessing the source image data;
transforming the source image data into an Interim Connection Space generated by the method of claim 1 to obtain Interim Connection Space data;
mapping the Interim Connection Space data to a gamut of the destination device; and
rendering the mapped data on the destination device.

* * * * *